US012415636B2

(12) United States Patent
Song et al.

(10) Patent No.: US 12,415,636 B2
(45) Date of Patent: Sep. 16, 2025

(54) TAKEOFF AND LANDING PLATFORM, UNMANNED AERIAL VEHICLE, TAKEOFF AND LANDING SYSTEM, STORAGE DEVICE AND TAKEOFF AND LANDING CONTROL METHOD

(71) Applicant: SZ DJI TECHNOLOGY CO., LTD., Shenzhen (CN)

(72) Inventors: Jianyu Song, Shenzhen (CN); Song Zhang, Shenzhen (CN); Shun Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/395,107

(22) Filed: Dec. 22, 2023

(65) Prior Publication Data
US 2024/0124169 A1    Apr. 18, 2024

Related U.S. Application Data

(63) Continuation of application No. PCT/CN2021/103660, filed on Jun. 30, 2021.

(51) Int. Cl.
*B64U 70/97* (2023.01)
*B60L 53/14* (2019.01)
(Continued)

(52) U.S. Cl.
CPC ............. *B64U 70/97* (2023.01); *B60L 53/14* (2019.02); *B64U 70/92* (2023.01); *B64U 80/25* (2023.01); *B64U 80/40* (2023.01); *B60L 2200/10* (2013.01)

(58) Field of Classification Search
CPC ........ B64U 70/97; B64U 70/92; B64U 80/25; B64U 80/40; B64U 50/37; B60L 53/14;
(Continued)

(56) References Cited

U.S. PATENT DOCUMENTS 4,123,020 A * 10/1978 Korsak ..................... B64F 1/00
 244/116
8,511,606 B1 * 8/2013 Lutke ..................... B64U 80/40
 320/109
(Continued)

FOREIGN PATENT DOCUMENTS

CN    105863353 A    8/2016
CN    108016606 A    5/2018
(Continued)

OTHER PUBLICATIONS

International Search Report of PCT/CN2021/103660 (Mar. 30, 2022).

*Primary Examiner* — Medhat Badawi
(74) *Attorney, Agent, or Firm* — Fideli Law PLLC; Qiang Li

(57) ABSTRACT

A takeoff and landing platform, a UAV, a takeoff and landing system, a storage device and a takeoff and landing control method are provided. The takeoff and landing platform includes: a bracket, one end of the bracket is fixed on a base, and another end thereof extends in a direction away from the base, and the bracket is provided with a vertical guide rail. Multiple UAVs may be vertically stacked on the bracket along the guide rail and take off from the bracket. Hence, the manpower investment and site investment are reduced for multiple UAVs to perform collaborative operations. It can not only reduce the cost of multiple UAV collaborative operations, but also improve the efficiency of multiple UAV collaborative operations.

17 Claims, 20 Drawing Sheets

(51) Int. Cl.
  *B64U 70/92* (2023.01)
  *B64U 80/25* (2023.01)
  *B64U 80/40* (2023.01)

(58) Field of Classification Search
  CPC ..... B60L 2200/10; B64C 39/024; B64C 5/04; B64F 1/02; Y02T 10/70; Y02T 10/7072; Y02T 90/14
  See application file for complete search history.

(56) References Cited

U.S. PATENT DOCUMENTS

| | | | | |
|---|---|---|---|---|
| 8,558,507 | B2* | 10/2013 | Uchihashi | A62C 3/16 169/56 |
| 8,956,100 | B2* | 2/2015 | Davi | B60P 1/02 414/334 |
| 9,139,310 | B1* | 9/2015 | Wang | B60L 58/12 |
| 9,238,414 | B2* | 1/2016 | Ryberg | B60L 53/80 |
| 9,783,075 | B2* | 10/2017 | Henry | G05D 1/654 |
| 9,957,045 | B1* | 5/2018 | Daly | B64U 50/19 |
| 10,007,272 | B2* | 6/2018 | Tirpak | G05D 1/042 |
| 10,207,820 | B2* | 2/2019 | Sullivan | B64U 80/25 |
| 10,453,348 | B2* | 10/2019 | Speasl | G06Q 10/08 |
| 10,625,859 | B2* | 4/2020 | Beckman | B61L 15/0081 |
| 10,800,524 | B2* | 10/2020 | Benezra | B64U 80/70 |
| 10,913,546 | B2* | 2/2021 | Krauss | B64F 1/18 |
| 11,054,224 | B1* | 7/2021 | Stephens | F41H 11/02 |
| 11,124,314 | B2* | 9/2021 | Tillotson | H02J 7/342 |
| 11,180,263 | B2* | 11/2021 | Ratajczak | B60L 53/36 |
| 11,498,700 | B2* | 11/2022 | Hehn | H02J 7/0042 |
| 11,634,219 | B2* | 4/2023 | Rowse | B64C 37/02 244/2 |
| 11,794,922 | B1* | 10/2023 | Twyford | B64U 80/25 |
| 11,813,950 | B2* | 11/2023 | O'Brien | B64U 80/40 |
| 11,884,422 | B2* | 1/2024 | Lowe | B64U 80/25 |
| 12,020,582 | B2* | 6/2024 | Barker | B65D 21/0215 |
| 12,037,137 | B2* | 7/2024 | Ratajczak | B60L 50/66 |
| 12,065,273 | B2* | 8/2024 | Kiyokami | B64U 10/13 |
| 2009/0266775 | A1* | 10/2009 | Vanderhoek | A47B 47/024 211/49.1 |
| 2010/0176762 | A1* | 7/2010 | Daymude | H02J 7/0044 320/110 |
| 2011/0139665 | A1* | 6/2011 | Madsen | B25H 3/026 206/508 |
| 2011/0301748 | A1* | 12/2011 | Lecarpentier | G07F 15/006 320/137 |
| 2012/0263989 | A1* | 10/2012 | Byun | H01M 50/271 361/752 |
| 2014/0062390 | A1* | 3/2014 | Webber | H02J 7/0013 320/107 |
| 2015/0183326 | A1* | 7/2015 | Ryberg | B60L 53/00 320/109 |
| 2016/0144982 | A1* | 5/2016 | Sugumaran | B64F 1/005 244/108 |
| 2016/0355337 | A1* | 12/2016 | Lert | B65G 1/0492 |
| 2016/0364989 | A1* | 12/2016 | Speasl | G08G 5/57 |
| 2016/0376031 | A1* | 12/2016 | Michalski | G08G 5/52 701/15 |
| 2017/0129464 | A1* | 5/2017 | Wang | H02J 7/0045 |
| 2017/0158353 | A1* | 6/2017 | Schmick | B60L 53/12 |
| 2017/0313514 | A1* | 11/2017 | Lert, Jr. | B65G 1/0478 |
| 2018/0086483 | A1* | 3/2018 | Priest | B64U 70/50 |
| 2018/0237161 | A1* | 8/2018 | Minnick | B64U 50/37 |
| 2018/0362188 | A1* | 12/2018 | Achtelik | H02J 7/0013 |
| 2019/0002127 | A1* | 1/2019 | Straus | B64F 1/362 |
| 2019/0023416 | A1* | 1/2019 | Borko | B66C 7/08 |
| 2019/0108472 | A1* | 4/2019 | Sweeney | G06Q 10/083 |
| 2019/0245365 | A1* | 8/2019 | Farrahi Moghaddam | H02J 7/0042 |
| 2019/0270526 | A1* | 9/2019 | Hehn | B64U 80/70 |
| 2019/0367185 | A1* | 12/2019 | Zambelli | E04H 6/44 |
| 2019/0383052 | A1* | 12/2019 | Blake | B64U 80/40 |
| 2020/0165007 | A1* | 5/2020 | Augugliaro | B64F 1/16 |
| 2020/0189734 | A1* | 6/2020 | Hörtner | B64U 80/70 |
| 2021/0074170 | A1* | 3/2021 | Barker | B64U 70/90 |
| 2021/0107682 | A1* | 4/2021 | Kozlenko | B64U 70/30 |
| 2021/0107684 | A1* | 4/2021 | Le Lann | B60L 53/52 |
| 2021/0155409 | A1* | 5/2021 | Haid | G06Q 10/08 |
| 2021/0163135 | A1* | 6/2021 | Shin | B64U 70/97 |
| 2021/0197983 | A1* | 7/2021 | Wang | B64F 1/222 |
| 2021/0309388 | A1* | 10/2021 | Ratajczak | B66F 19/00 |
| 2022/0019247 | A1* | 1/2022 | Dayan | B64F 1/222 |
| 2022/0411053 | A1* | 12/2022 | Baumgartner | B64D 9/00 |
| 2023/0106432 | A1* | 4/2023 | Baumgartner | G05D 1/221 701/2 |
| 2023/0406499 | A1* | 12/2023 | Woodworth | B64D 1/10 |
| 2024/0037487 | A1* | 2/2024 | Clise | B64D 1/12 |
| 2024/0111310 | A1* | 4/2024 | Ehasoo | B64U 70/20 |
| 2024/0124169 | A1* | 4/2024 | Song | B64U 80/25 |

FOREIGN PATENT DOCUMENTS

| | | |
|---|---|---|
| CN | 110413004 A | 11/2019 |
| CN | 111452647 A | 7/2020 |
| CN | 111806711 A | 10/2020 |
| CN | 112061392 A | 12/2020 |
| GB | 201513021 A | 9/2015 |

* cited by examiner

TAKEOFF AND LANDING PLATFORM, UNMANNED AERIAL VEHICLE, TAKEOFF AND LANDING SYSTEM, STORAGE DEVICE AND TAKEOFF AND LANDING CONTROL METHOD

RELATED APPLICATIONS

This application is a continuation application of PCT application No. PCT/CN2021/103660, filed on Jun. 30, 2021, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technical field of unmanned aerial vehicles (UAVs), and in particular to a takeoff and landing platform for multiple UAVs, a UAV, a UAV takeoff and landing system, a storage device and a UAV takeoff and landing control method.

BACKGROUND

With the rapid development in the UAV technologies, the functions of UAVs are becoming more and more diversified, and the application scenarios of UAVs are becoming more and more extensive. Correspondingly, there are more and more scenarios that require multiple UAVs to perform collaborative operations. For example, in scenarios such as UAV performance or UAV transportation of emergency supplies, multiple UAVs are often needed to work together.

In the existing technologies, in the cases where multiple UAVs need to be used for collaborative operations, during the stages of UAV takeoff site layout, UAV preparation and battery replacement, and UAV landing and recovery, etc., the operations need high manpower investments and large sites. This may not only increase the cost of the collaborative operation of multiple UAVs, but also reduce the efficiency of the collaborative operation.

SUMMARY

In order to solve the problems of high cost and low efficiency of multiple UAV cooperative operations in the existing technology, embodiments of the present disclosure provide a takeoff and landing platform for multiple UAVs, a UAV, a UAV takeoff and landing (docking) system, a storage device, and a UAV takeoff and landing control method.

In one aspect, exemplary embodiments of the present disclosure provide a platform, including a base; a bracket, including a guide rail extended upright from the base; an accommodating portion defined in the bracket and extended along the guide rail, the accommodating portion including an opening away from the base, where the accommodating portion is configured to accommodate the plurality of UAVs which are stacked on the bracket along the guide rail and take off from the opening.

In another aspect, exemplary embodiments of the present disclosure provide a docking system, including a platform including: a bracket, including a vertical guide rail; and a plurality of unmanned aerial vehicles (UAVs), where each UAV includes: one of a protruding structure and a recessing structure disposed at a bottom part of the UAV, the other one of the protruding structure and the recessing structure disposed on a top part of the UAV, where the protruding structure is configured to be at least partially embedded in the recessing structure to facilitate vertical stacking of the UAV, where the plurality of UAVs is configured to be stacked vertically on the takeoff and landing platform, the plurality of UAVs is configured to be vertically stacked on the takeoff and landing platform in a landing process, and the plurality of UAVs is configured to take off from the takeoff and landing platform in a takeoff process.

In the embodiments of the present application, by providing a bracket(s) on the takeoff and landing platform, when multiple UAVs land, the multiple UAVs may be vertically stacked on the bracket along a guide rail; when multiple UAVs take off, the multiple UAVs may take off from the bracket. That is to say, the takeoff and landing platform may be used to realize the takeoff and landing of multiple UAVs. In this way, it is possible to avoid manual UAV takeoff site layout, preparation, and landing recovery operations, and reduce manpower and site investment when multiple UAVs perform collaborative operations. It may not only reduce the cost of multiple UAV collaborative operations, but also improve the efficiency of multiple UAV collaborative operations.

BRIEF DESCRIPTION OF THE DRAWINGS

In order to more clearly illustrate the technical solutions of the embodiments of the present disclosure, the following will briefly introduce the drawings for the description of some exemplary embodiments. Apparently, the accompanying drawings in the following description are some exemplary embodiments of the present disclosure. For a person of ordinary skill in the art, other drawings may also be obtained based on these drawings without creative efforts.

Figure 1:
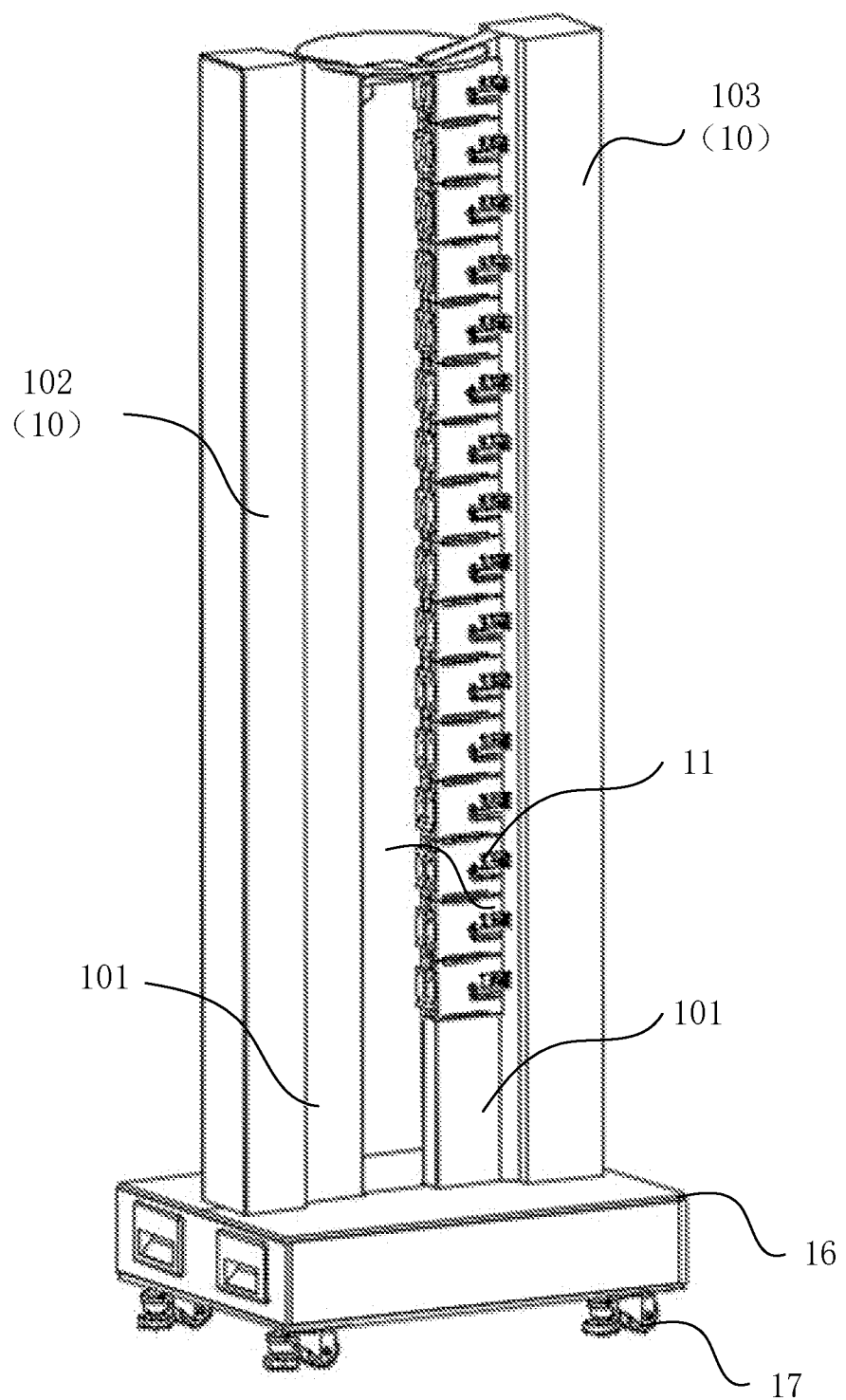
FIG. 1 is a schematic diagram of the structure of a takeoff and landing platform according to some exemplary embodiments of the present disclosure.

Description of element symbols in the drawings: 10—bracket, 101—guide rail, 102—first bracket, 1021—first inclined surface, 103—second bracket, 1031—second inclined surface, 104—casing, 105—sealing plate, 106—opening, 11—first charging module, 12—guide carrier plate, 121—lower recess part, 122—first guide part, 123—first opening, 124—second opening, 13—lifting module, 131—driving member, 132—screw, 133—sliding block, 134—support block, 14—flow guide frame, 141—flow guide opening, 142—flow guide plate, 143—support frame, 15—lifting device, 151—lifting mechanism, 152—accommodating bin, 153—connecting mechanism, 16—base, 17—auxiliary moving device, 18—air flow generating device, 181—air flow outlet, 100—UAV, 20—body, 201—bearing platform, 21—arm, 22—recessing structure, 23—protruding structure, 231—planar part, 232—second guide part, 24—connecting frame, 241—third opening, 242—fourth opening, 25—propeller, 26—propeller protective cover, 30—storage platform, 301—first telescopic frame, 3011—first frame body, 3012—first telescopic mechanism, 302—second telescopic frame, 31—takeoff and landing platform.

DETAILED DESCRIPTION

The technical solutions in some exemplary embodiments of the present disclosure will be described below with reference to the accompanying drawings in the embodiments of the present disclosure. Obviously, the described embodiments are part of the embodiments of the present disclosure, but not all of the embodiments. Based on the exemplary embodiments in the present disclosure, all other embodiments obtained by a person of ordinary skill in the art without creative efforts fall within the scope of protection of the present disclosure.

The features with "first" and "second" in the description and claims of this disclosure may include one or more of these features, either explicitly or implicitly. In the description of this disclosure, unless otherwise stated, "a plurality of" means two or more. In addition, "and/or" in the description and claims indicates at least one of the related objects, and the character "/" generally indicates that the related objects are in an "or" relationship.

In the description of this disclosure, it needs to be understood that the orientation or positional relationships indicated by terms like "center", "longitudinal", "transverse", "length", "width", "thickness", "upper", "lower", "front", "back", "left", "right", "vertical", "horizontal", "top", "bottom", "inside", "outside", "clockwise", "counter-clockwise", "axial", "radial", "circumferential", etc. are based on the orientation or positional relationship shown in the drawings. They are merely to facilitate the description of the present disclosure and to simplify the description, and are not intended to indicate or imply that the device or element referred to must have a specific orientation, or be constructed and operate in a specific orientation. Therefore, they cannot be construed as a limitation on this disclosure.

In the description of the present disclosure, it should be noted that, unless otherwise explicitly stipulated and limited, the terms "mounting", "connecting" and "linking" should be understood in a general sense. For example, it may be a fixed connection, a detachable connection, or an integral connection; can be a mechanical connection or an electrical connection; can be a direct connection, or an indirect connection via an intermediate medium, or can be an internal connection between two components. For a person of ordinary skill in the art, the specific meanings of the above terms in the present disclosure can be understood on a case-by-case basis.

Figure 2:
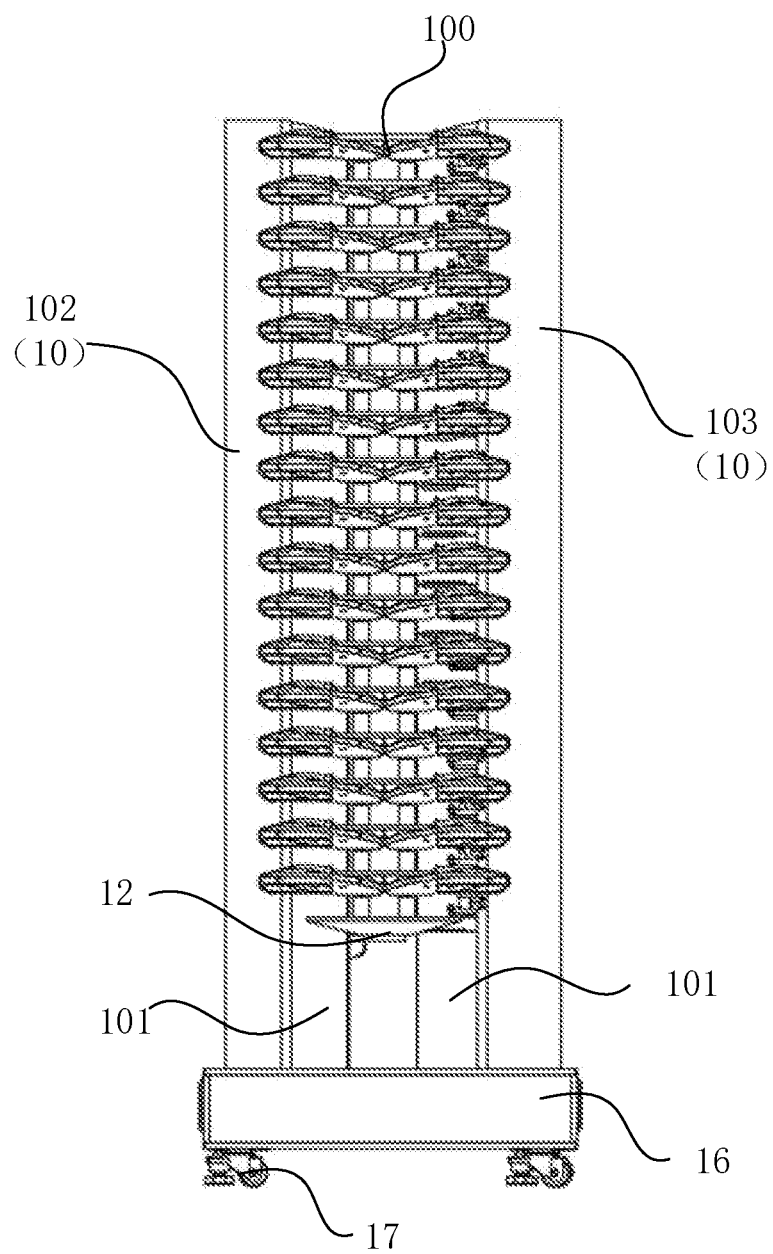
FIG. 2 is a schematic diagram of the structure of a takeoff and landing system using the takeoff and landing platform shown in FIG. 1.
Figure 3:
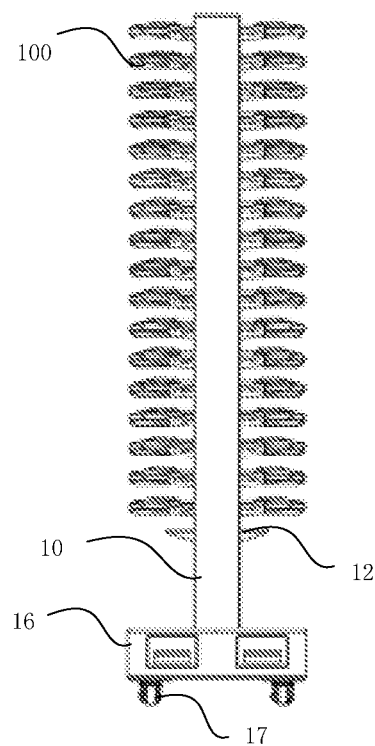
FIG. 3 is a schematic diagram of the structure of the takeoff and landing system shown in FIG. 2 viewed from another angle.
Figure 4:
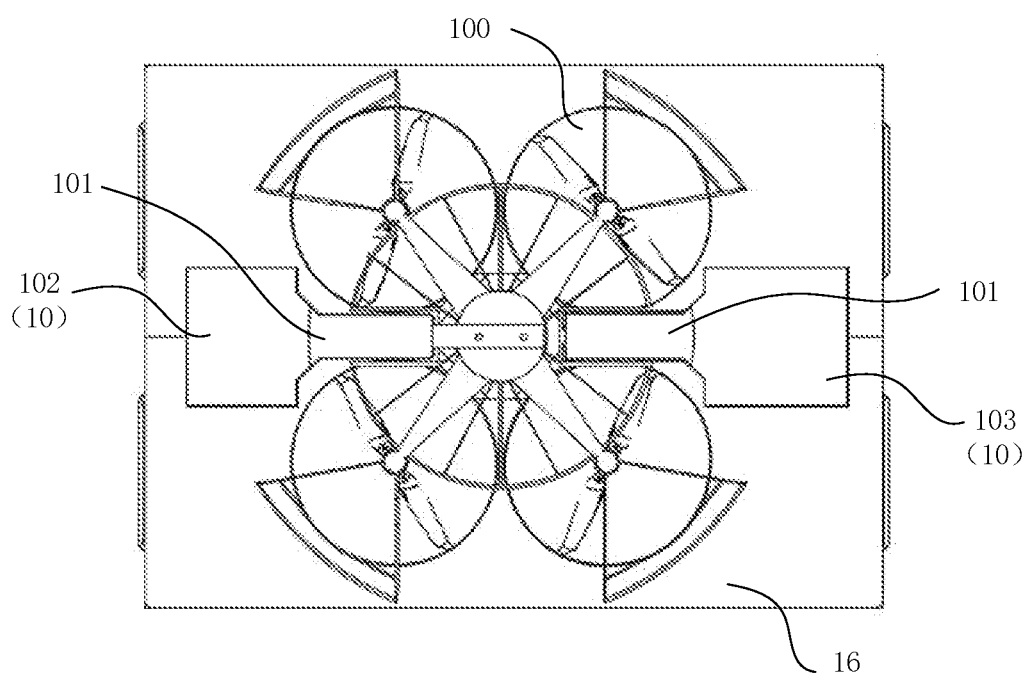
FIG. 4 is a schematic diagram of the structure of the takeoff and landing system shown in FIG. 2 viewed from another angle.

Reference may be made to the following figures, FIG. 1 is a schematic diagram of the structure of a takeoff and landing platform according to some exemplary embodiments of the present disclosure; FIG. 2 is a schematic diagram of the structure of a takeoff and landing system using the takeoff and landing platform shown in FIG. 1; FIG. 3 is a schematic diagram of the structure of the takeoff and landing system shown in FIG. 2 viewed from another angle; FIG. 4 is a schematic diagram of the structure of the takeoff and landing system shown in FIG. 2 viewed from another angle. The takeoff and landing platform may specifically include:

A bracket 10, where the bracket 10 is provided with a vertical/upright guide rail(s) 101;

Multiple UAVs 100 may be vertically stacked on the bracket 10 along the vertical/upright guide rail(s) 101, and may take off from the bracket 10.

In the present disclosure, the bracket 10 is provided on the takeoff and landing platform. In the case of multiple UAVs 100 landing, the multiple UAVs 100 may be vertically stacked on the bracket 10 along the guide rail 101. In the case of the multiple UAVs 100 taking off, the multiple UAVs 100 may take off from the bracket 10. That is, the takeoff and landing platform may be used to implement the takeoff and landing of the multiple UAVs 100. In this way, it is possible to avoid manual operations of UAV 100 takeoff site layout, preparation, and landing recovery, and reduce manpower and site investment when multiple UAVs 100 perform collaborative operations. It may not only reduce the cost of multiple UAV 100 collaborative operations, but also improve the efficiency of multiple UAV 100 collaborative operations.

For example, in a UAV performance scenario where multiple UAVs 100 perform collaborative operations, multiple UAVs 100 may be stacked and stored on the takeoff and landing platform. When the multiple UAVs 100 need to take off, the multiple UAVs 100 may take off from the bracket 10 on the takeoff and landing platform. In this way, the manual operation for arranging the takeoff site and placing multiple UAV 100s one by one on the takeoff site may be avoided. After the performance is completed, the multiple UAVs 100 may be vertically stacked on the bracket 10 along the guide rail(s) 101 on the bracket 10, thus avoiding the problem of the UAVs 100 first landing at the takeoff site and then relying on manual labor to recover and store the multiple UAVs 100. On the one hand, this may reduce the venue investment and manpower investment required for UAV 100 performances; on the other hand, the efficiency of UAV 100 performances may also be improved.

In some exemplary embodiments, in the case where multiple UAVs 100 are stacked vertically on the bracket 10, the takeoff and landing platform may include a storage state and a charging state; where in the storage state, the takeoff and landing platform is used to store the multiple UAVs 100; in the charging state, the takeoff and landing platform may be used to charge the multiple UAVs 100 to improve the endurance of the UAVs 100.

In a specific application, when the takeoff and landing platform is in the storage state, the multiple UAVs 100 on the takeoff and landing platform may be arranged as compactly as possible to reduce the volume occupied by the multiple UAVs 100 and facilitate the reduction of the space required for storage and transportation of the takeoff and landing platform and the UAV 100. When the takeoff and landing platform is in the charging state, the distance between the UAVs 100 should be reasonably controlled to facilitate charging of multiple UAVs 100 and improve charging safety. Therefore, the positions of the multiple UAVs 100 relative to the bracket 10 in the storage state may be different from the positions of the multiple UAVs 100 relative to the bracket 10 in the charging state.

In some exemplary embodiments, the takeoff and landing platform may also be provided with: a plurality of first charging modules 11 stacked vertically on the bracket 10. In the charging state, the first charging modules 11 may be electrically connected to a second charging module of the UAV 100 to charge the UAV 100 and improve the endurance of the UAV 100.

Specifically, the takeoff and landing platform may also be provided with a control module. The control module may be in communication with the plurality of first charging modules 11 to control the first charging modules 11 to charge the UAVs 100.

In some exemplary embodiments, the first charging module 11 may include a charging interface and a signal transmission interface. The charging interface may be used to charge the UAV 100; the signal transmission interface may be used to implement data exchange between the first charging module 11 and the second charging module.

Specifically, when the first charging module 11 and the second charging module are interface-connected, the charging interface and the signal transmission interface may be interface-connected to the second charging module at the same time. The charging interface may be electrically connected to a charging interface on the UAV 100 to charge the UAV 100. The signal transmission interface may be connected to a signal interface on the UAV 100 to exchange data between the first charging module 11 and the UAV 100, for example, download the data of the UAV 100, update the firmware of the UAV 100, identify the code of the UAV 100, or enter the route, etc.

Specifically, the height of the UAV 100 is the first height, and the vertical interval between two adjacent first charging modules 11 is the first interval, where the first interval is greater than the first height. In this way, it would be easy to align the second charging module on the UAV 100 with the first charging module 11 on the takeoff and landing platform.

In practical applications, the interval between UAVs 100 may be adjusted with reference to the first interval between the first charging modules 11, so that the second charging module on the UAV 100 may be aligned with the first charging module 11 on the takeoff and landing platform.

In some exemplary embodiments, the bracket 10 may be provided with a storage space for accommodating the multiple UAVs 100. Specifically, when the multiple UAVs 100 are stacked on the bracket 10, the multiple UAVs 100 may be stored in the storage space.

In practical applications, the guide rail 101 and the first charging module 11 may both be disposed in the storage space. This is to facilitate the guide rail 101 to guide the stack of the UAV 100, and to facilitate the first charging module 11 to charge the UAV 100.

As shown in FIG. 2, the bracket 10 may include a first bracket 102 and a second bracket 103, where the first bracket 102 and the second bracket 103 are relatively spaced apart. The storage space is formed between the first bracket 102 and the second bracket 103. The first bracket 102 and the second bracket 103 are each provided with a guide rail 101 to guide the UAVs 100 from both sides and introduce the UAVs 100 into the storage space, and support the UAVs 100 from both sides to improve the stacking reliability of the UAVs 100.

In some exemplary embodiments, the guide rails 101 of the first bracket 102 and the second bracket 103 are at least partially embedded in the multiple UAVs 100 to limit the movement of the UAVs 100 in the storage space, such that the UAVs 100 are prevented from shaking in the storage space, so as to improve the stacking reliability of the UAVs 100 in the storage space.

In some exemplary embodiments, the number of the bracket 10 is one, and the storage space is formed on the bracket 10. Specifically, in order to improve the stacking reliability of the UAVs 100 on the bracket 10, the storage space may be located at a center of the bracket 10.

In some exemplary embodiments, the UAV 100 may be provided with a mounting through hole(s). In the case where multiple UAVs 100 are vertically stacked on the bracket 10, the mounting through holes of the UAVs 100 may be sleeved on the bracket 10. Specifically, the mounting through hole may be provided in a central area of the UAV 100 to improve the stacking reliability of the UAV 100 on the bracket 10.

In practical applications, when the UAV 100 needs to land, the mounting through hole on the UAV 100 may be aligned with the bracket 10. In this way, the UAV 100 is then landed to connect the mounting through holes on the UAV 100 with the bracket 10 to realize stacking of the UAV 100 on the bracket 10.

In some exemplary embodiments, the guide rails 101 on the bracket 10 may be at least partially embedded in the multiple UAVs 100, such that the movement of the UAV 100 in the storage space is limited to prevent the UAV 100 from shaking on the bracket 10.

In specific applications, the UAV 100 may be provided with an opening. When multiple UAVs 100 need to be stacked vertically, the openings on the UAVs 100 may be aligned with the guide rail 101 on the bracket 10, and then the UAV 100 is controlled to descend, such that the guide rail 101 on the bracket 10 is embedded in the opening of the UAV 100.

It should be noted that in the drawings of the present disclosure, only the case where the number of brackets 10 is two and the storage space is formed between the two brackets 10 is shown. In practical applications, the number of brackets 10 may be selected according to actual conditions. For example, the number of brackets 10 may be 1, 2, 3 or 5, etc. The present disclosure does not limit the number of the bracket 10. When the number of the bracket 10 is multiple (two or more), the storage space may be formed between the multiple bracket 10.

In specific applications, the takeoff and landing platform may also include: a guide carrier plate 12. The guide carrier plate 12 is at least partially disposed in the storage space. The guide carrier plate 12 is used to carry the UAV 100.

Specifically, the guide carrier plate 12 may be movably connected to the bracket 10. During a takeoff process of the UAV 100, the guide carrier plate 12 may move upward to lift the UAV 100. During the landing process of the UAV 100, the guide carrier plate 12 may move downward, so that the UAV 100 may vertically descends and be stacked on the bracket 10.

Figure 5:
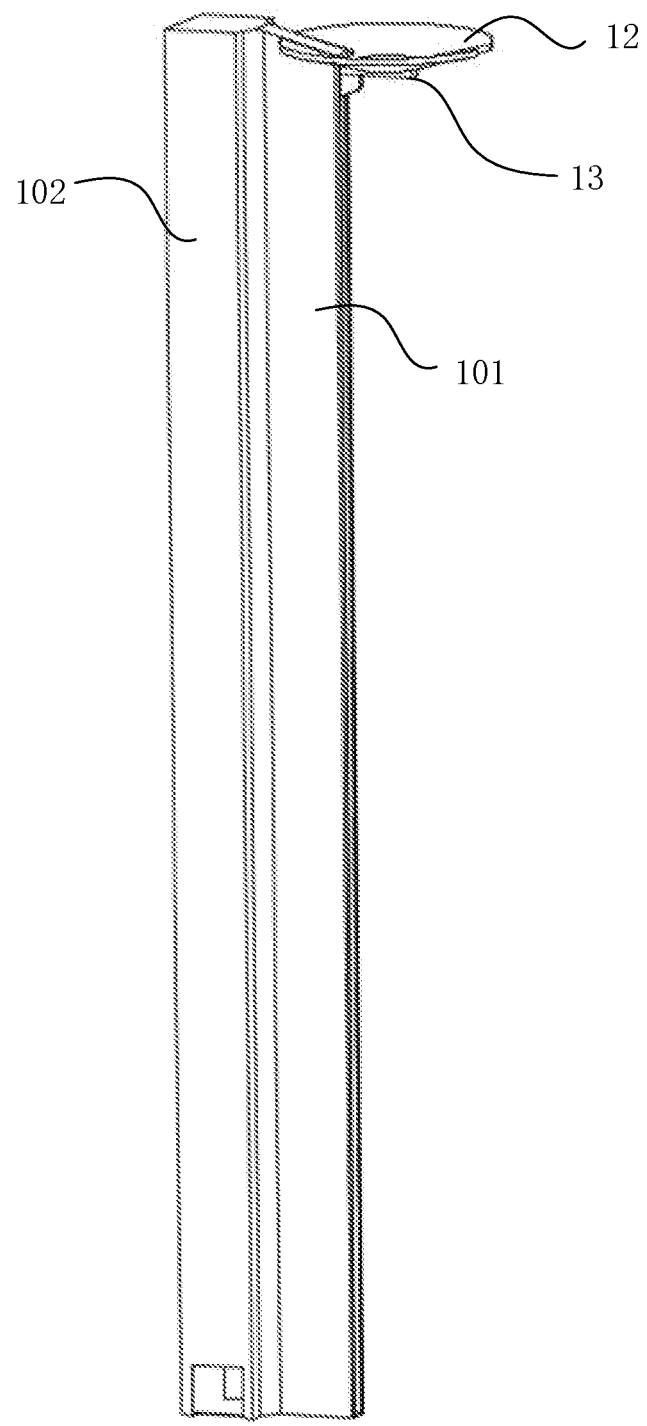
FIG. 5 is a schematic diagram of the structure of a first bracket according to some exemplary embodiments of the present disclosure.
Figure 6:
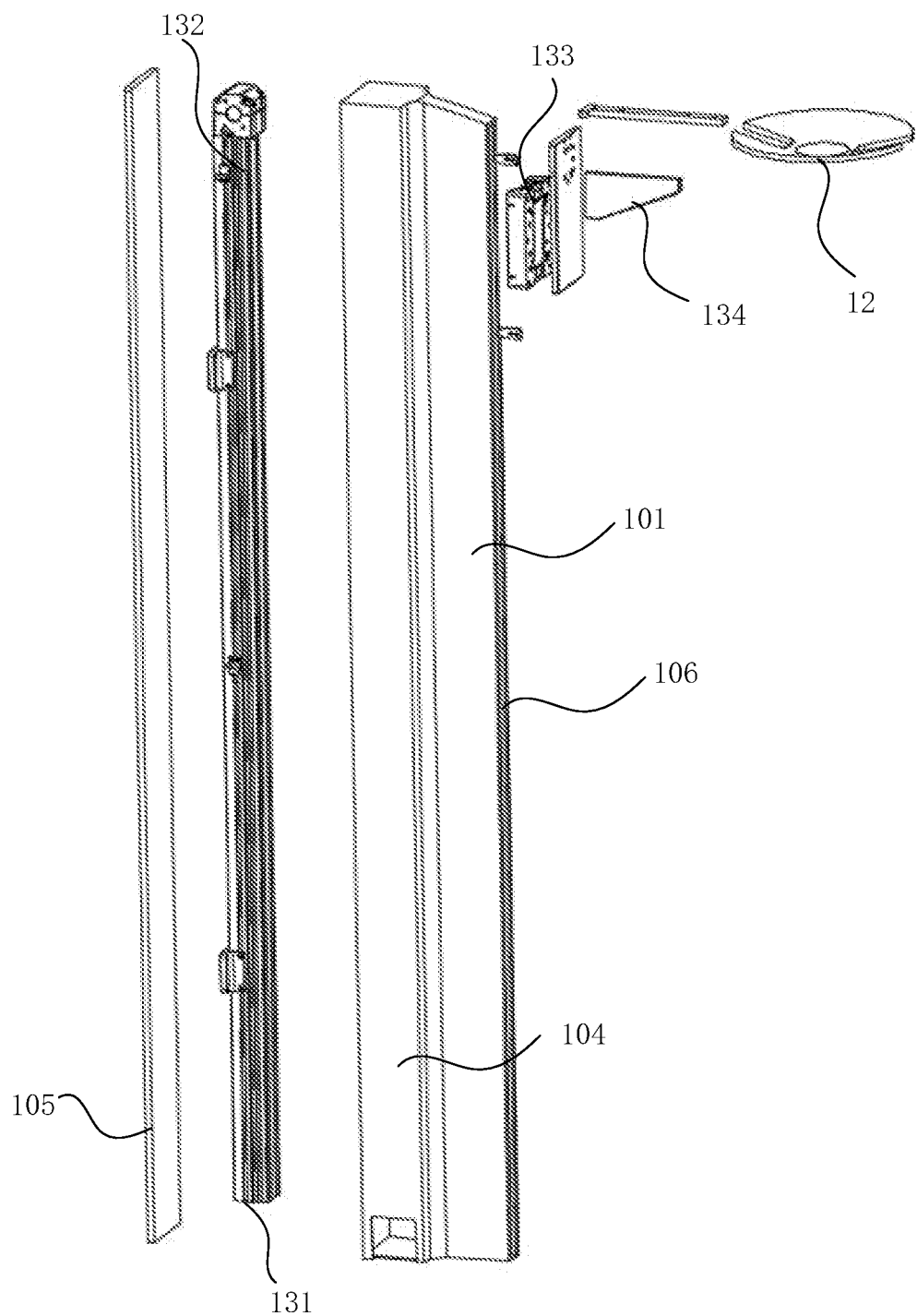
FIG. 6 is a schematic exploded diagram of the structure of the first bracket shown in FIG. 5.
Figure 7:
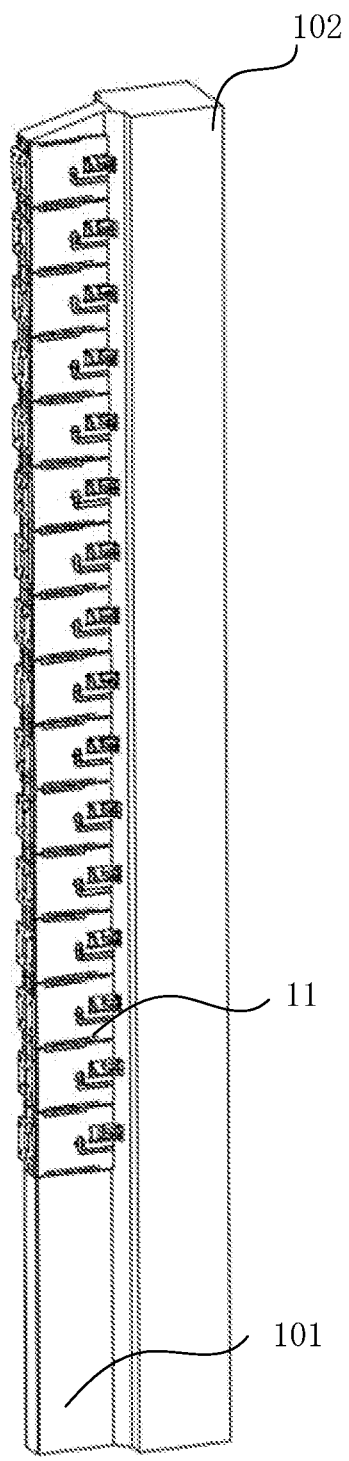
FIG. 7 is a schematic diagram of the structure of a second bracket according to some exemplary embodiments of the present disclosure.
Figure 8:
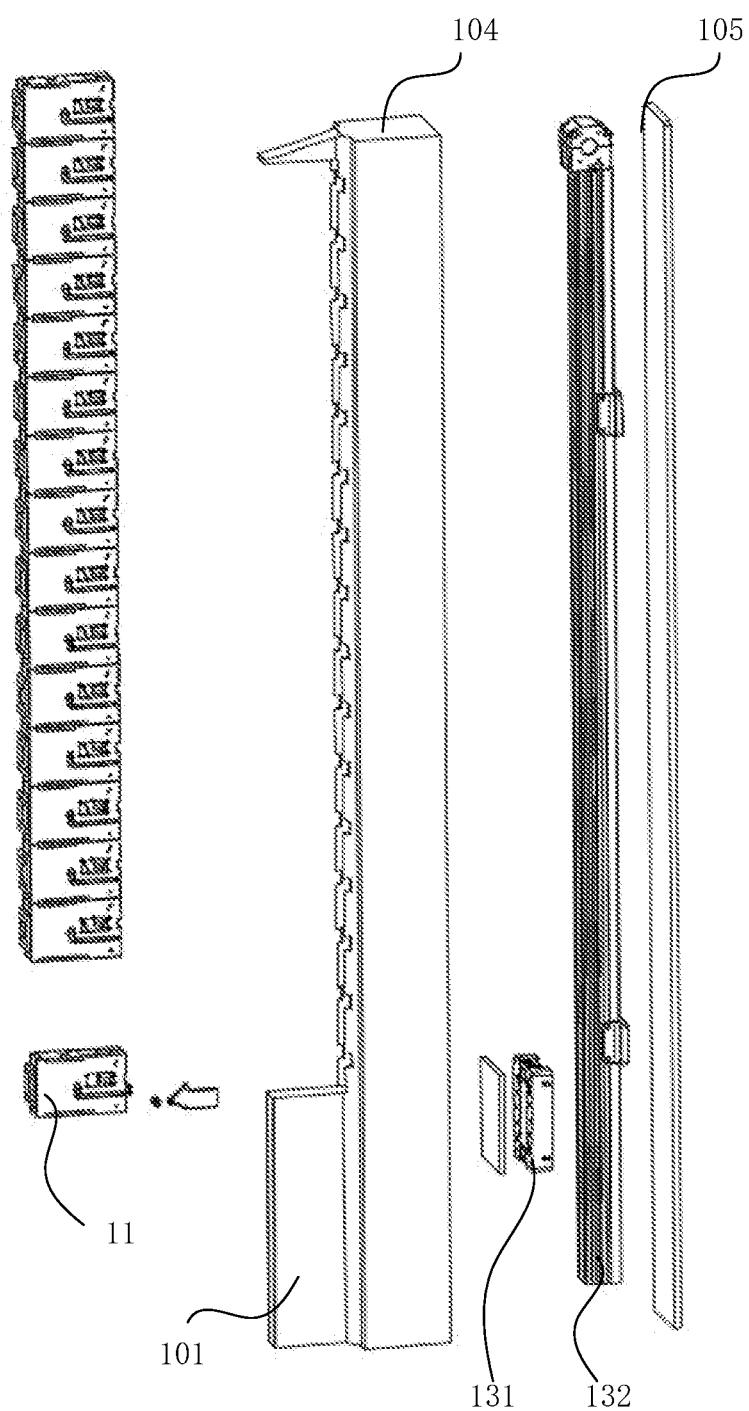
FIG. 8 is a schematic exploded diagram of the structure of the second bracket shown in FIG. 7.

FIG. 5 is a schematic diagram of the structure of a first bracket according to some exemplary embodiments of the present disclosure. FIG. 6 is a schematic exploded diagram of the structure of the first bracket shown in FIG. 5. FIG. 7 is a schematic diagram of the structure of a second bracket according to some exemplary embodiments of the present disclosure. FIG. 8 is a schematic exploded diagram of the structure of the second bracket shown in FIG. 7.

As shown in FIG. 5 to 8, the guide carrier plate 12 may be connected to the first bracket 102 and the second bracket 103, and the first charging module 11 may be connected to the second bracket 103.

Figure 9:
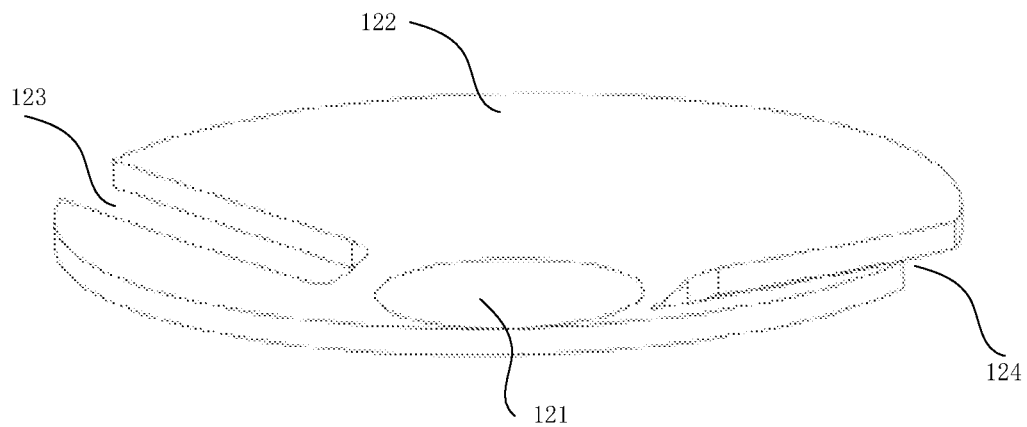
FIG. 9 is a schematic diagram of the structure of a guide carrier plate 12 according to some exemplary embodiments of the present disclosure.

Referring to FIG. 9, a schematic structural diagram of a guide carrier plate 12 according to some exemplary embodiments of the present disclosure is shown. As shown in FIG. 9, the guide carrier plate 12 may include a lower recess part 121 and a first guide part 122, where the lower recess part 121 is arranged in a central area of the guide carrier plate 12; the first guide part 122 is arranged at an edge area of the guide carrier plate 12 and surrounds the lower recess part 121; one side of the first guide part 122 is connected to an edge of the lower recess part 121, and another side of the first guide part 122 extends in a direction away from the lower recess part 121 and obliquely upward.

Specifically, the lower recess part 121 may be located at a center of the storage space, and used to connect with a bottom of the body of the UAV 100 and support the UAV 100. The first guide part 122 may be used to guide the UAV 100 into the lower recess part 121.

In some exemplary embodiments, the lower recess part 121 may have a planar structure to fully contact the bottom of the UAV 100, thereby improving the support reliability of the guide carrier plate 12 for the UAV 100.

In some exemplary embodiments, the first guide part 122 may have an inclined planar structure or a curved surface structure. In this way, during the landing of the UAV 100, the UAV 100 may slide along the inclined first guide part 122 into the lower recess part 121 to achieve reliable support of the UAV 100 by the guide carrier plate 12.

In some exemplary embodiments, in the case where the bracket 10 includes a first bracket 102 and a second bracket 103, the first guide part 122 may be provided with a first opening 123 and a second opening 124. The first opening 123 may be sleeved over the guide rail 101 of the first bracket 102, and the second opening 124 may be sleeved over the guide rail 101 of the second bracket 103, so as to limit the movement of the guide carrier plate 12 on the first bracket 102 and the second bracket 103.

In specific applications, the first opening 123 and the second opening 124 may be arranged on the first guide part 122 of the guide carrier plate 12, the first opening 123 is sleeved over the guide rail 101 on the first bracket 102, and the second opening 124 is sleeved over the guide rail 101 on the second bracket 103. Thus, this may limit the guide carrier plate 12 to only slide along the guide rail 101 on the first bracket 102 and the second bracket 103, thereby preventing the guide carrier plate 12 from shaking on the first bracket 102 and the second bracket 103.

Figure 10:
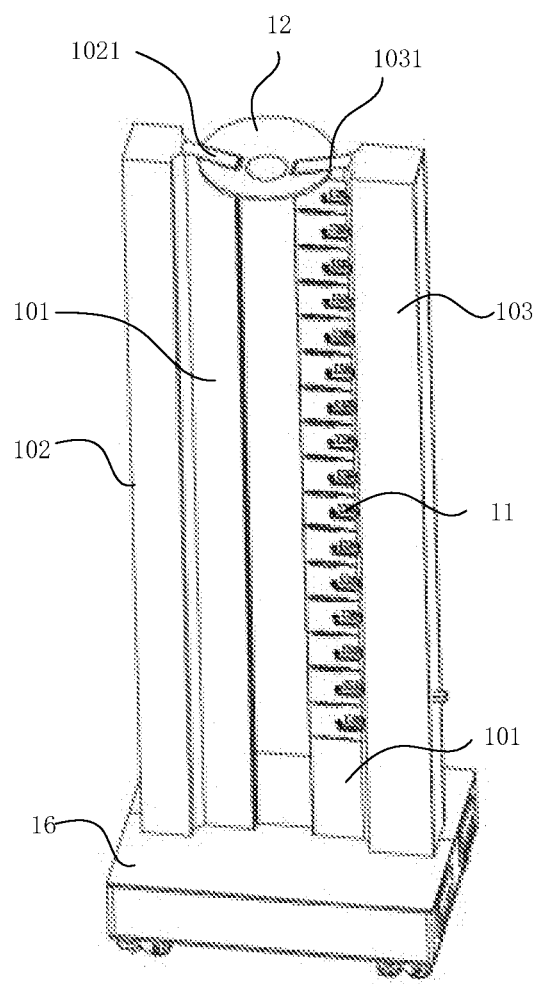
FIG. 10 is a schematic diagram of the structure of a takeoff and landing platform according to some exemplary embodiments of the present disclosure.

FIG. 10 is a schematic diagram of the structure of a takeoff and landing platform according to some exemplary embodiments of the present disclosure. As shown in FIG. 10, a top part of the guide rail 101 of the first bracket 102 is provided with a first inclined surface 1021, and a top part of the guide rail 101 of the second bracket 103 is provided with a second inclined surface 1031. The shape of the first inclined surface 1021 and the second inclined surface 1031 may be adapted to the shape of the first guide part 122. When the guide carrier plate 12 moves to the top of the guide rail 101, the first inclined surface 1021 and the second inclined surface 1031 may be flush with the first guide part 122 to form a complete profile to better guide the UAV 100 into the lower recess part 121 in the central area of the guide carrier plate 12.

Specifically, the shape of the first inclined surface 1021 and the second inclined surface 1031 may be adapted to the first guide part 122 as follows: the cross-sectional shape of the first inclined surface 1021 and the second inclined surface 1031 may be the same as the cross-sectional shape of the first guide part 122. For example, when the cross-sectional shape of the first guide part 122 is an inclined plane, the cross-sectional shapes of the first inclined surface 1021 and the second inclined surface 1031 may be correspondingly inclined planes. In another example, when the cross-sectional shape of the first guide part 122 is an inclined curved surface, the cross-sectional shapes of the first inclined surface 1021 and the second inclined surface 1031 may be respectively inclined curved surfaces.

In some exemplary embodiments, the bracket 10 is also provided with a lifting module 13. The lifting module 13 may slide along the bracket 10 and is connected to the guide carrier plate 12. The lifting module 13 may be used to lift the guide carrier plate 12. In practical applications, by sliding the lifting module 13 along the bracket 10, the guide carrier plate 12 may be driven to slide up and down along the bracket 10, so as to lift the UAV 100 on the guide carrier plate 12 to the top of the bracket 10, or lower the UAV 100 on the guide carrier plate 12 to the bottom of the bracket 10.

In some exemplary embodiments, the lifting module 13 may include: a driving member 131, a screw 132 and a sliding block 133, where an output end of the driving member 131 may be connected to the screw 132 for driving the screw 132 to rotate, and the axial direction of the screw 132 is parallel to the guide direction of the guide rail 101; the sliding block 133 is provided with a threaded hole, the threaded hole is sleeved over the screw 132 and connected to the thread of the screw 132; the rotation of the screw 132 may drive the sliding block 133 to slide along the axial direction of the screw 132. The sliding block 133 may be used to connect to the guide carrier plate 12 to drive the guide carrier plate 12 to slide along the bracket 10.

Specifically, the driving member 131 may be a servo motor. The servo motor may be connected to a bottom part of the screw 132. An output end of the servo motor may be connected to the screw 132. When the servo motor rotates, the screw 132 may be driven to rotate accordingly. Moreover, the rotation direction of the screw 132 may be consistent with the rotation direction of the servo motor.

It should be noted that in practical applications, in order to achieve reliable lifting of the guide carrier plate 12, the lifting module 13 may be provided for both the first bracket 102 and the second bracket 103.

In some exemplary embodiments, the bracket 10 may also include: a casing 104 and a sealing plate 105 that can be matched and connected to each other. A accommodation cavity may be formed between the casing 104 and the sealing plate 105, where the guide rail 101 is provided on the casing 104; the driving member 131 and the screw 132 are both arranged in the accommodation cavity. At least part of the sliding block 133 is exposed and extends outside the guide rail 101 to connect to the guide carrier plate 12.

As shown in FIG. 6, the first bracket 102 may be enclosed by the casing 104 and the sealing plate 105. As shown in FIG. 8, the second bracket 103 may also be enclosed by the casing 104 and the sealing plate 105.

In specific applications, by arranging the driving member 131 and the screw 132 in the accommodation cavity formed by the casing 104 and the sealing plate 105, this may achieve a protective effect on the driving member 131 and the screw 132 to prevent external water and impurities from entering the interior of the driving member 131 and the screw 132 to cause a short circuit of the driving member 131 or affect the movement accuracy of the screw 132. Thus, it may improve the working reliability of the lifting module 13.

Specifically, since the sliding block 133 at least partially extends outside the guide rail 101 and is configured to slide up and down along the guide rail 101, a long opening 106 may be provided on the guide rail 101 to facilitate the sliding of the slider 133 along the opening 106. The extending direction of the opening 106 may be consistent with the extending direction of the guide rail 101.

In some exemplary embodiments, the lifting module 13 may also include a support block 134. One end of the support block 134 may be fixed on the sliding block 133, and another end thereof may extend outside the guide rail 101 and be connected to a bottom part of the guide carrier plate 12 to fully support the guide carrier plate 12 and improve the support reliability from the lifting module 13 for the guide carrier plate 12.

In some exemplary embodiments, the takeoff and landing platform may also include a control module. The control module is electrically connected to the lifting module 13. When multiple UAVs 100 land, the control module may control the lifting module 13 to drive the guide carrier plate 12 to descend, so that the multiple UAVs 100 may be vertically stacked on the bracket 10 along the guide rail 101. When the multiple UAVs 100 take off, the control module may control the lifting module 13 to drive the guide carrier plate 12 to rise, so that the multiple UAVs 100 may take off based on the bracket 10.

Specifically, the control module may be electrically connected to the driving member 131 in the lifting module 13 to control the driving member 131 to rotate forward or reverse so as to drive the guide carrier plate 12 to rise or fall; thus the UAV 100 is driven to rise or fall by the rise or fall of the guide carrier plate 12.

For example, the control module may be disposed in the accommodation cavity inside the bracket 10, or may be disposed in the base 16 at the bottom of the bracket 10. The present disclosure does not limit the location of the control module.

In some exemplary embodiments, the takeoff and landing platform may also include: an elastic receiving part. At least part of the elastic receiving member may be arranged in the storage space. The elastic receiving member may be used to receive the UAV 100.

In practical applications, during the landing of the UAV 100, the UAV 100 may first land on the elastic receiving member. Since the elastic receiving member is at least partially disposed in the storage space, the elastic compression of the elastic receiving member may not only buffer the impact of the falling UAV 100, but also guide the UAV 100 into the storage space.

In some exemplary embodiments, the compression direction of the elastic receiving member may be consistent with the extension direction of the guide rail 101. In this way, during the landing of the UAV 100, with the compression of the elastic receiving member along the compression direction thereof, the UAV 100 may be driven to slide along the guide rail 101, which may improve the stacking efficiency of multiple UAVs 100.

In some exemplary embodiments, the elastic receiving member may include at least one of a spring or an elastic piece. The present disclosure does not specifically limit the specific type of the elastic receiving member.

In some exemplary embodiments, the takeoff and landing platform may also include: a guide member. The guide member is connected to the bracket 10. The guide member may be used to guide the UAV 100 into the storage space, so that the UAV 100 may be quickly stacked in the storage space of the bracket 10.

Specifically, the guide member may include at least one of a mechanical guide member, an electric guide member, or a pneumatic guide member. The present disclosure does not limit the specific type of the guide member.

Figure 11:
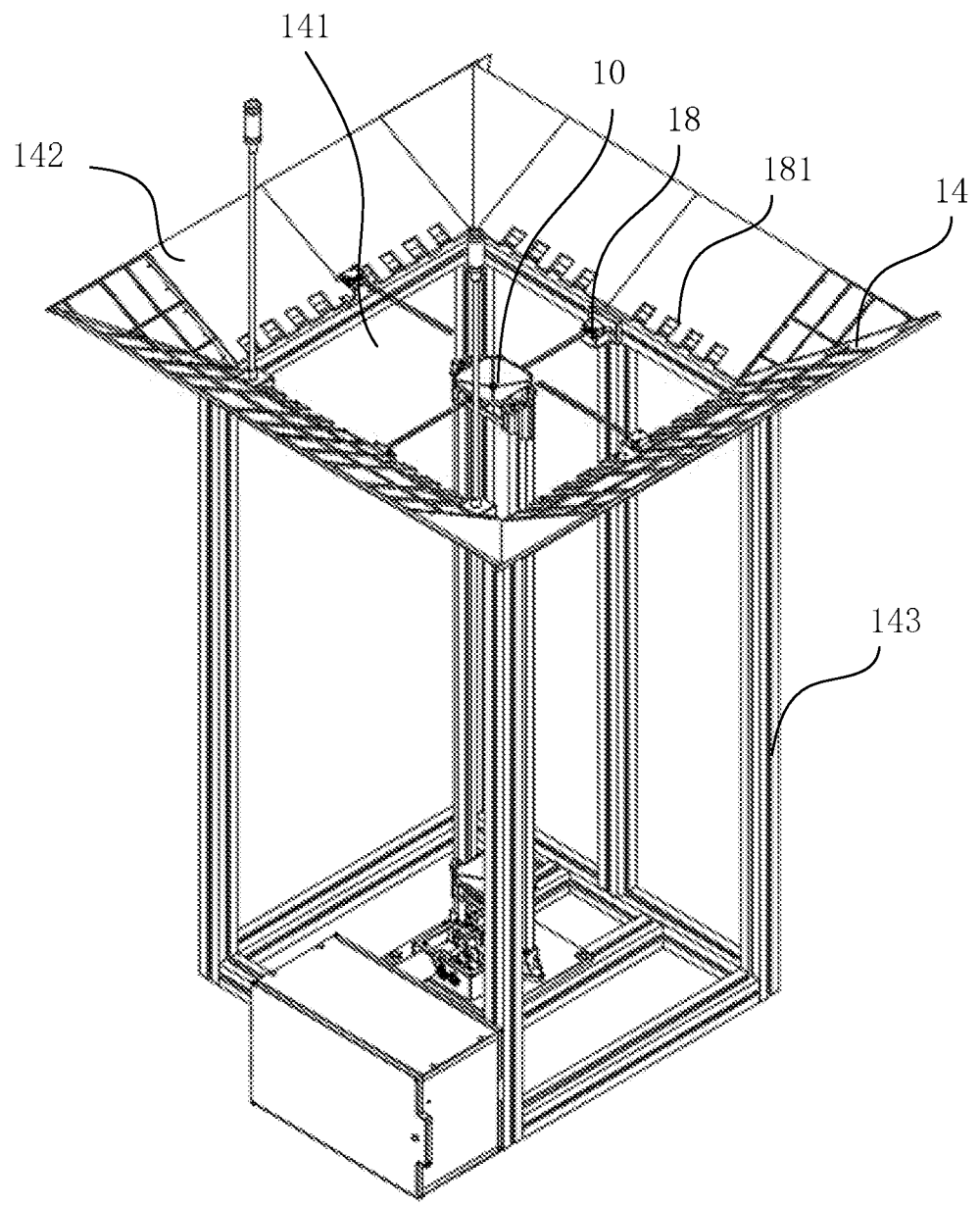
FIG. 11 is a schematic diagram of the structure of a takeoff and landing platform according to some exemplary embodiments of the present disclosure.
Figure 12:
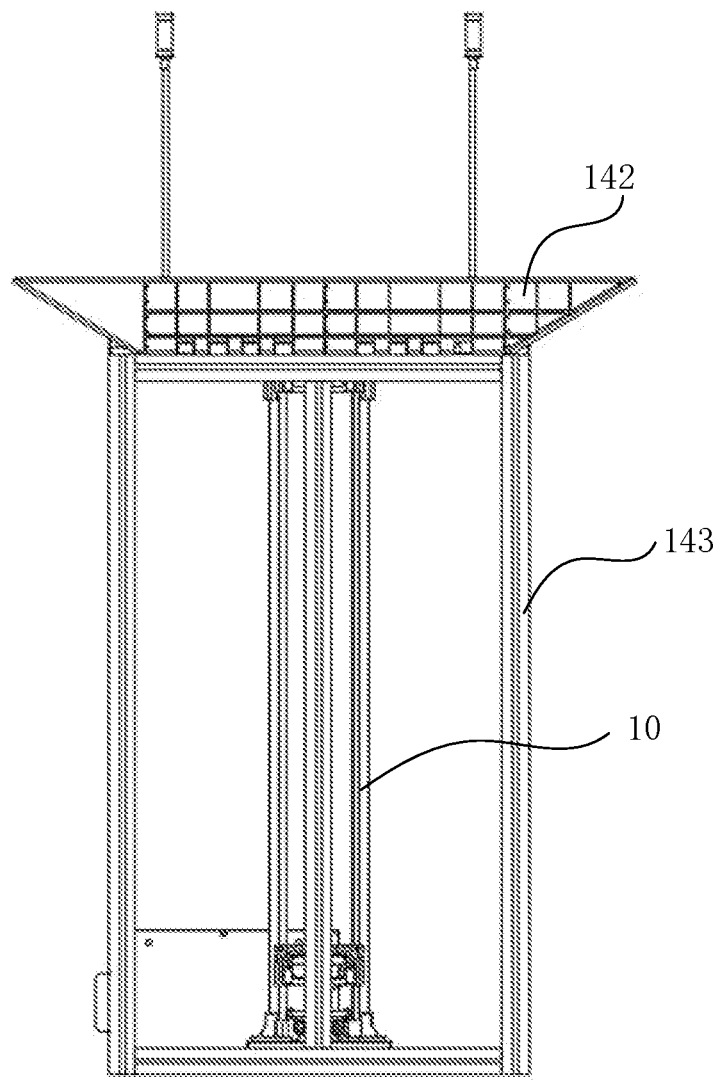
FIG. 12 is a schematic diagram of the structure of the takeoff and landing platform shown in FIG. 11 viewed from another angle.

FIG. 11 is a schematic diagram of the structure of a takeoff and landing platform according to some exemplary embodiments of the present disclosure. FIG. 12 is a schematic diagram of the structure of the takeoff and landing platform shown in FIG. 11 viewed from another angle. As shown in FIGS. 11 and 12, the guide member may include a flow guide frame 14. The flow guide frame 14 may be arranged on the top part of the bracket 10 and surrounds the storage space. The flow guide frame 14 may utilize the downward airflow generated by the UAV 100 to push the UAV 100 toward the storage space.

Specifically, the flow guide frame 14 may be arranged around the storage space of the bracket 10. During the landing process of the UAV 100, the UAV 100 may generate downward airflow. When the downward airflow acts on the flow guide frame 14, the downward airflow may rebound due to the blocking effect of the flow guide frame 14. Thus, the rebound airflow acts on the UAV 100, the UAV 100 may be pushed toward the storage space.

In some exemplary embodiments, the flow guide frame 14 may be provided with a flow guide opening 141. The flow guide opening 141 is opposite to the storage space. Specifically, the flow guide frame 14 may push the UAV 100 to the flow guide opening 141, so that the UAV 100 may enter the storage space opposite to the flow guide opening 141 to achieve the stacking of the UAVs 100 in the storage space.

In some exemplary embodiments, the flow guide frame 14 may include a plurality of flow guide plates 142. The plurality of flow guide plates 142 may be connected in sequence around the circumference of the flow guide opening 141. One side of the flow guide plate 142 is close to the flow guide opening 141, and another side thereof extends in an upward direction away from the flow guide opening 141. In this way, by tilting the flow guide plates 142 around the flow guide opening 141, the UAV 100 may be pushed towards the flow guide opening 141.

Specifically, the plurality of flow guide plates 142 may be in a circular shape and connected around the circumferential direction of the flow guide opening 141, or may be in a rectangular, pentagonal or hexagonal shape and connected around the circumferential direction of the flow guide opening 141. The present disclosure does not specifically limit the surrounding shape of the plurality of flow guide plates 142. In practical applications, two adjacent flow guide plates 142 may be fixedly connected by snap-on connection, fastener connection, or other connection methods. The present disclosure may not specifically limit the fixed connection method between the flow guide plates 142.

In some exemplary embodiments, the flow guide plate 142 may be an inclined flat plate or arc-shaped plate, and the present disclosure does not limit the specific shape of the flow guide plate 142.

In some exemplary embodiments, the flow guide frame 14 may also include: a support frame 143, which is connected to the flow guide plate 142 to support the flow guide plate 142. The support frame 143 may be provided around the bracket 10.

In practical applications, the support frame 143 may be fixed, together with the bracket 10 on the base 16 at the bottom of the bracket 10, or may be arranged separately from the bracket 10. The present disclosure does not specifically limit the connection method between the support frame 143 and the bracket 10.

In some exemplary embodiments, the flow guide frame 14 is also equipped with a buffer pad. The buffer pad may be used to buffer the impact force when the UAV 100 landing on the flow guide frame 14.

Specifically, during the landing process of the UAV 100, the UAV 100 may fail to accurately land on the guide opening 141 but land on the guide plate 142. By arranging a buffer pad on the flow guide plate 142 of the flow guide frame 14, the impact when the UAV 100 comes into contact with the flow guide plate 142 may be reduced, and the service life of the flow guide frame 14 may be improved.

In some exemplary embodiments, the buffer pad may include: at least one of a rubber pad or a foam pad. The present disclosure does not limit the specific type of the buffer pad.

In some exemplary embodiments, the guide member may include: an air flow generating device 18; the air flow generating device 18 is arranged on the top of the first bracket 102 and the second bracket 103, and is arranged around the storage space, a plurality of airflow devices 18 may push the UAV 100 toward the storage space.

Specifically, the air flow generating device 18 can generate an air flow. Since the air flow generating devices 18 is arranged around the storage space, when UAV 100 is landing, the air flow generated by the air flow generating device 18 may push the UAV 100 toward the storage space, thereby facilitating the stacking of the UAV 100 in the storage space.

In some exemplary embodiments, the air flow generating device 18 may include: a plurality of air flow outlets 181. Each air flow outlet 181 may release an air flow to propel the UAV 100. The plurality of air flow outlets 181 may be positioned around the storage space to push the UAV 100 toward the storage space from multiple directions. In this way, even if the landing position of the UAV 100 is relatively complex, through the synergy of the plurality of air flow outlets, the UAV 100 may still be accurately pushed to the storage space, thereby improving the guidance accuracy of the air flow generating device 18 for the UAV 100.

It should be noted that in practical applications, multiple air flow outlets 181 may share one air flow generating device 18, or each air flow outlet may correspond to an independent air flow generating device 18. The present disclosure does not limit this.

Figure 13:
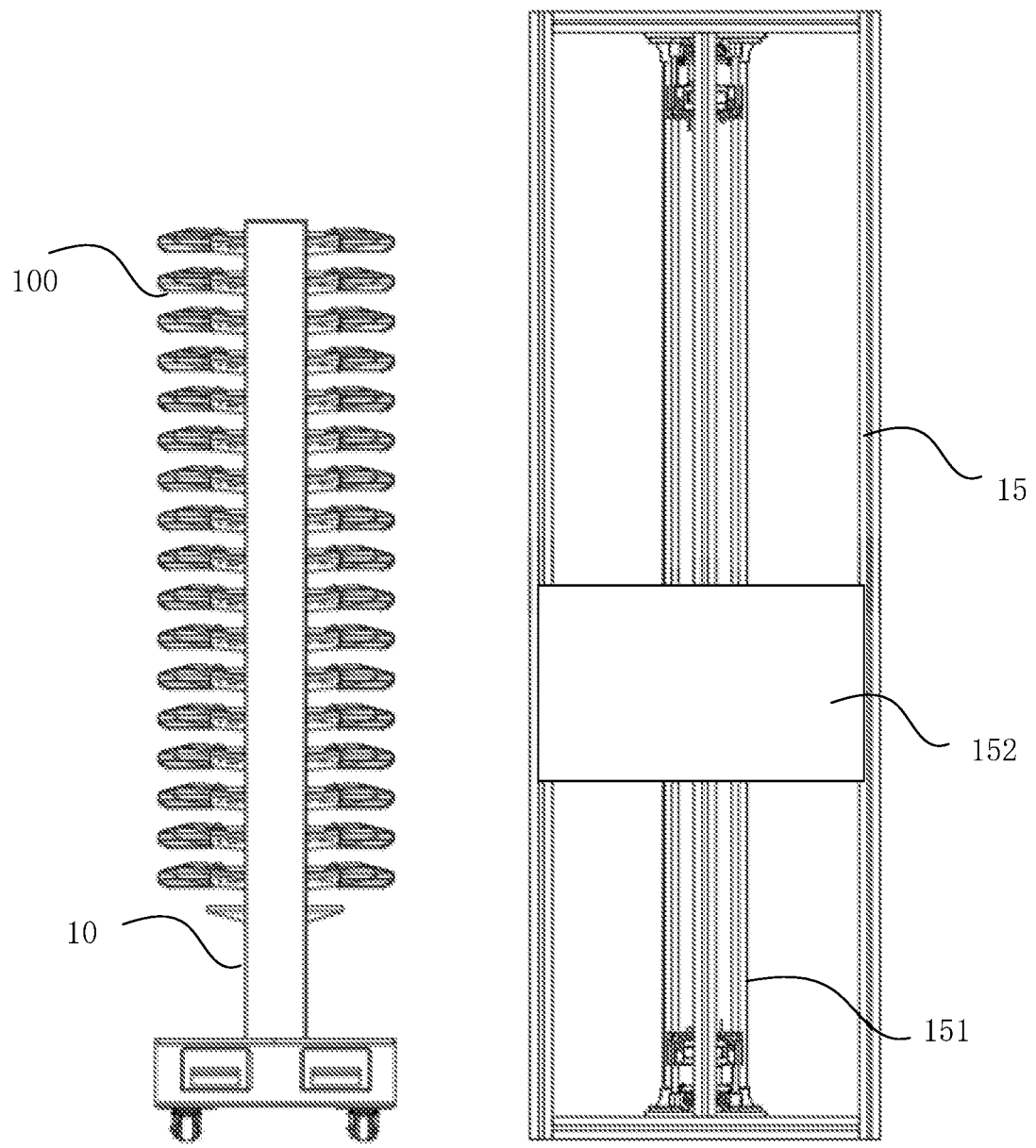
FIG. 13 is a schematic diagram of the structure of a takeoff and landing platform according to some exemplary embodiments of the present disclosure.
Figure 14:
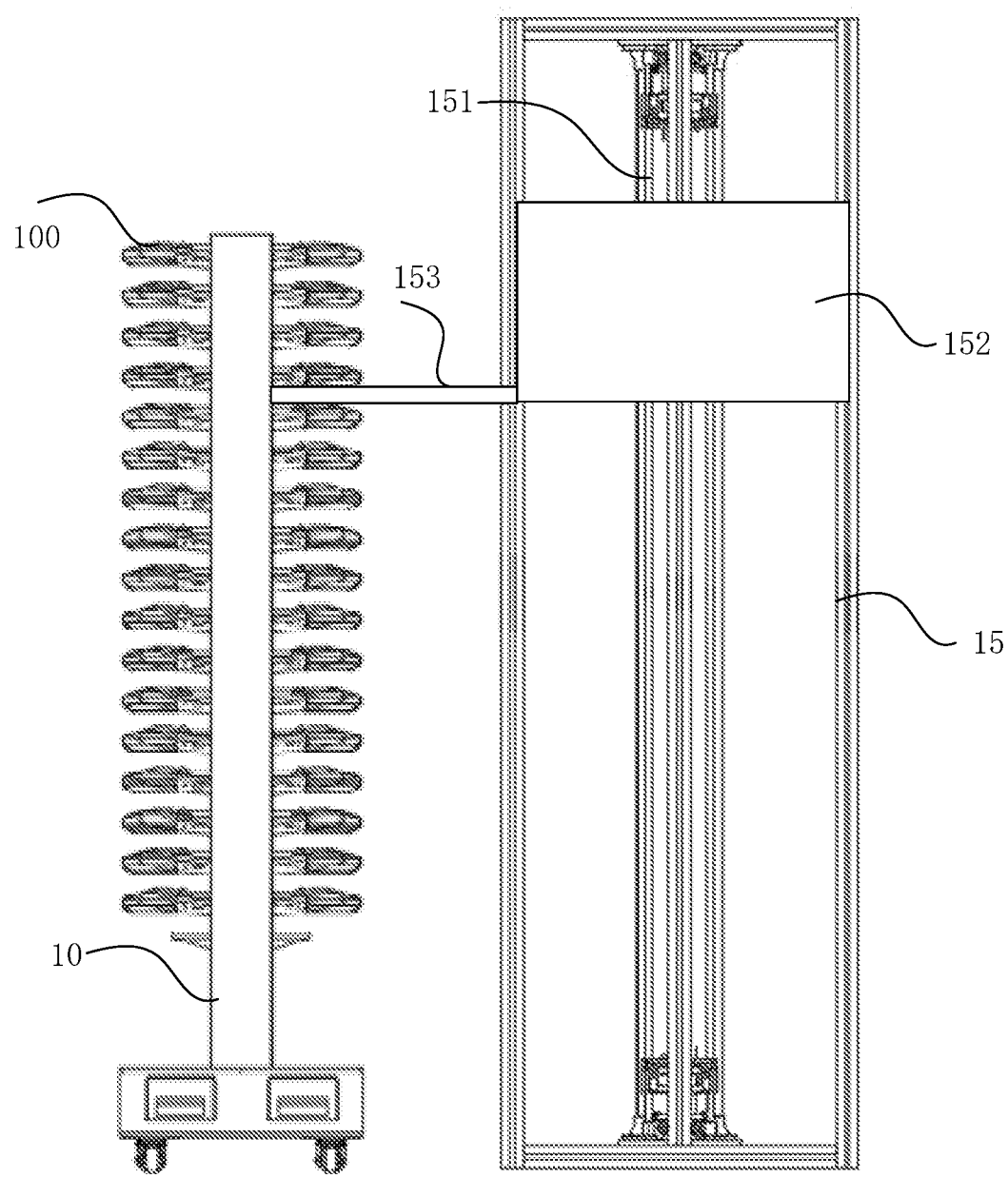
FIG. 14 is a schematic diagram of the structure of a takeoff and landing platform shown in FIG. 13.

FIG. 13 is a schematic diagram of the structure of a takeoff and landing platform according to some exemplary embodiments of the present disclosure; FIG. 14 is a schematic diagram of the structure of a takeoff and landing platform shown in FIG. 13. As shown in FIGS. 13 and 14, the takeoff and landing platform may also include: a lifting device 15. The lifting direction of the lifting device 15 is consistent with the extending direction of the bracket 10, where when the UAV 100 is stacked on the bracket 10, the lifting device 15 may transport a target object (target) carried on the UAV 100.

Specifically, the lifting device 15 may be used in conjunction with the bracket 10. The lifting device 15 is consistent with the extending direction of the bracket 10 and may be raised or lowered in the vertical direction. When multiple UAVs 100 are stacked on the bracket 10, the lifting device 15 may transport the target object carried on the UAV 100 to a location other than the bracket 10. Alternatively, the target object is transported to the UAV 100 from an external location other than the bracket 10 to realize the input and output of the target object.

In some exemplary embodiments, the target may be passengers or cargo. For example, in the case where the UAV 100 is a passenger UAV 100, the target may be a passenger. In another example, in the case where the UAV 100 is a logistics UAV 100, the target object may be cargo. The present disclosure does not limit the specific content of the target object.

In some exemplary embodiments, the lifting device 15 may specifically include a lifting mechanism 151 and an accommodating bin 152. The accommodating bin 152 may be used to accommodate the target object; and the accommodating bin 152 is connected to the lifting mechanism 151. The lifting mechanism 151 may drive the accommodating bin 152 to rise or fall to transport the target object.

Specifically, the lifting mechanism 151 may be provided with a lifting bracket and a lifting driving mechanism. The lifting driving mechanism may be connected to the accommodation bin 152 to drive the accommodation bin 152 to rise or fall along the lifting bracket.

For example, the lifting driving mechanism may include a motor, a push rod, or other driving mechanism that may drive the accommodation bin 152 to rise or fall. The present disclosure does not specifically limit the lifting driving mechanism.

Specifically, the accommodation bin 152 may include a cabin body and a bin door for accommodating the target object. When the bin gate is open, it is convenient for the target object to enter and exit the cabin; when the cabin door is closed, the target object in the cabin may be protected.

As shown in FIG. 14, the lifting device 15 may also include: a connecting mechanism 153. The connecting mechanism 153 is connected to the accommodation bin 152. In the case where the accommodation bin 152 is aligned with a target UAV, the connecting mechanism 153 may be connected between the accommodation bin 152 and the target UAV, so as to transfer the target object from the target UAV to the accommodation bin 152, or transfer the target object from the accommodation bin 152 to the target UAV.

Specifically, the target UAV may be a UAV 100 among the multiple UAVs 100 for transporting the target object. For example, when the multiple UAVs 100 are stacked vertically on the bracket 10, if the top UAV 100 needs to transport the target object, the top UAV 100 may be used as the target UAV.

In some exemplary embodiments, the connecting mechanism 153 serves as a bridge connecting the accommodation bin 152 and the target UAV. By means of the connecting mechanism 153, the target object in the accommodation bin 152 can be transferred to the target UAV; alternatively, the target object in the target UAV can be transferred to the accommodation bin 152.

In some exemplary embodiments, the connecting mechanism 153 may specifically include an unfolded state and a folded state. As shown in FIG. 14, in the unfolded state, the connecting mechanism 153 may connect between the accommodation bin 152 and the target UAV to realize the transfer of the target object between the accommodation bin 152 and the target UAV. As shown in FIG. 13, in the folded state, the connecting mechanism 153 may be folded into the accommodation bin 152 to realize the storage of the connecting mechanism 153.

For example, when it is necessary to transport the target object between accommodation bin 152 and the target UAV, the connecting mechanism 153 may be unfolded to keep the connecting mechanism 153 in the unfolded state so as to achieve the transfer of the target object between the accommodation bin 152 and the target UAV. When the accommodation bin 152 needs to be raised or lowered, the connecting mechanism 153 may be folded into the accommodation bin 152 to avoid the connecting mechanism 153 from affecting the rising and falling of the accommodation bin 152.

In some exemplary embodiments, the takeoff and landing platform may also include: a base 16. One end of the bracket 10 is fixed on the base 16, and the other end of the bracket 10 extends in a direction away from the base 16. The bottom of the base 16 is also provided with an auxiliary moving device 17. The auxiliary mobile device 17 may assist the movement of the takeoff and landing platform in order to improve the moving convenience of the takeoff and landing platform.

In some exemplary embodiments, the auxiliary moving device 17 may include at least one of a roller or a caster. The present disclosure does not limit the auxiliary moving device 17. In summary, the takeoff and landing platform described herein may at least have the following advantages:

In the present disclosure, by providing a bracket on the takeoff and landing platform, in the case of landing of the multiple UAVs, the multiple UAVs may be vertically stacked on the bracket along the guide rail. In the case of take-off of the multiple UAVs, the multiple UAVs can take off from the bracket. That is, the takeoff and landing platform may be used to realize the takeoff and landing of the multiple UAVs. In this way, it is possible to avoid manual UAV take-off site layout, preparation and landing recovery operations, and reduce manpower and site investment when multiple UAVs perform collaborative operations. It may not only reduce the cost of multiple UAV collaborative operations, but also improve the efficiency of the multiple UAV collaborative operations.

The present disclosure also provides a UAV. The UAV may include, but is not limited to, any one of passenger UAV, logistics UAV, aerial photography UAV, performance UAV, battle UAV and agricultural plant protection UAV. The present disclosure does not specifically limit the type of UAV.

In some exemplary embodiments, the bottom of the UAV may be provided with one of a protruding structure and a recessing structure, and the top of the UAV forms the other one of the protruding structure and the recessing structure. The protruding structure may be at least partially embedded within the recessing structure to facilitate vertical stacking of multiple UAVs, so as to achieve high-density storage of multiple UAVs on the takeoff and landing platform.

Specifically, a protruding structure can be provided at the bottom of the UAV, and a recessing structure may be provided at the top of the UAV. In the case of multiple UAVs stacked vertically, for two adjacent UAVs, the protruding structure at the bottom of the upper UAV may be at least partially embedded in the recessing structure at the top of the lower UAV. Alternatively, a recessing structure may be at the bottom of the UAV and a protruding structure may be at the top of the UAV. In the case of multiple UAVs stacked vertically, for two adjacent UAVs, the protruding structure at the top of the lower UAV may be at least partially embedded in the recessing structure at the bottom of the upper UAV.

It should be noted that in the present disclosure, only the case where a protruding structure is provided at the bottom of the UAV and a recessing structure is provided at the top of the UAV is shown. The case where the recessing structure is at the bottom of the UAV and the protruding structure is at the top of the UAV may follow the same working principles.

Figure 15:
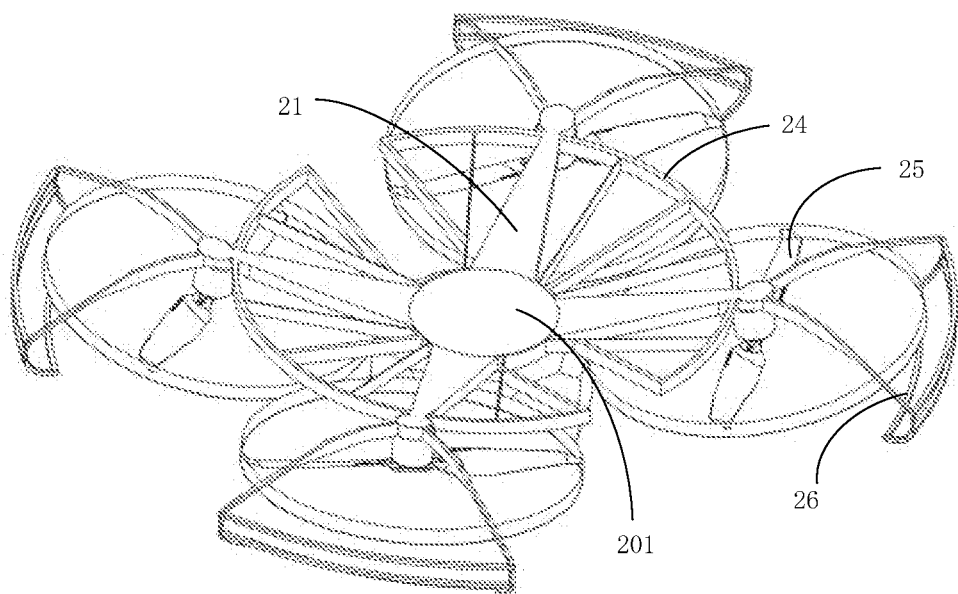
FIG. 15 is a schematic diagram of the structure of a UAV according to some exemplary embodiments of the present disclosure.
Figure 16:
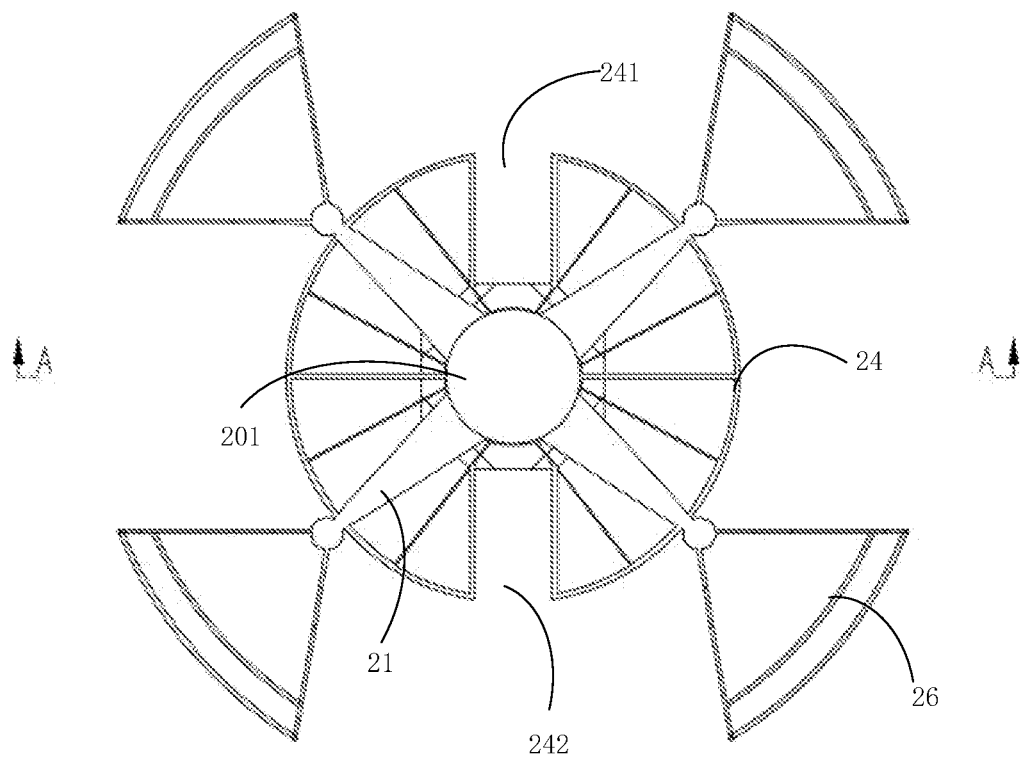
FIG. 16 is a schematic diagram of the structure of the UAV shown in FIG. 15 viewed from another angle.
Figure 17:
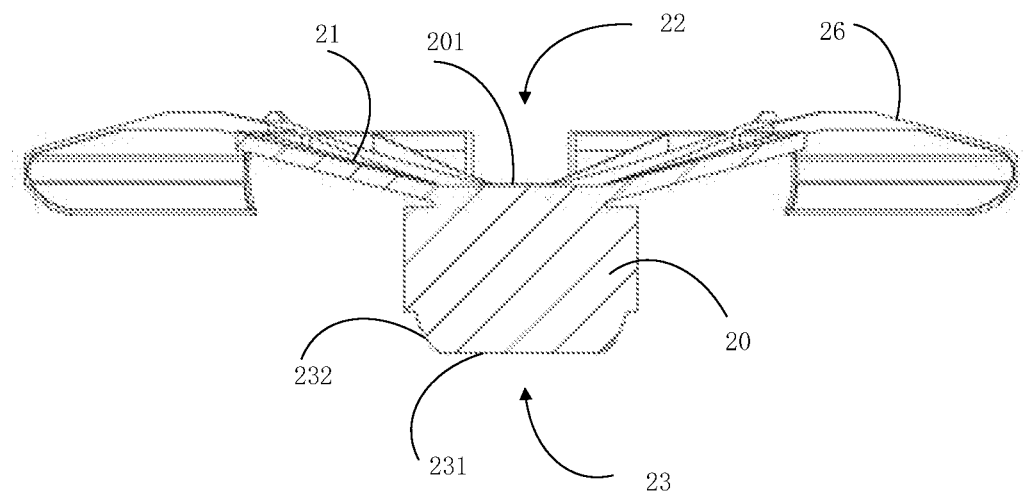
FIG. 17 is a schematic diagram of the structure of an A-A section of the UAV shown in FIG. 15.

FIG. 15 is a schematic diagram of the structure of a UAV according to some exemplary embodiments of the present disclosure. FIG. 16 is a schematic diagram of the structure of the UAV shown in FIG. 15 viewed from another angle. FIG. 17 is a schematic diagram of the structure of an A-A section of the UAV shown in FIG. 15.

In some exemplary embodiments, the UAV may specifically include: a body 20 and a plurality of arms 21 connected to the body 20. The recessing structure 22 may be arranged on the top of the body 20, and the protruding structure 23 may be arranged on the bottom of the body 20.

Specifically, the body 20 of the UAV may serve as the structural main body of the UAV. One end of the arm 21 may be connected to the body 20, and the other end thereof may be used to connect a propeller 25. In practical applications, the arm 21 can be a folding machine arm or a non-folding machine arm. The present disclosure does not limit this.

In the present disclosure, when the top of the body 20 is provided with a recessing structure 22 and the bottom of the body 20 is provided with a protruding structure 23, for multiple UAVs stacked vertically, for two UAVs adjacent to each other, the protruding structure 23 at the bottom of the upper UAV body 20 can be at least partially embedded in the recessing structure 22 at the top of the lower UAV body 20 structure to achieve assisted positioning and high-density storage of multiple UAVs.

In some exemplary embodiments, the protruding structure 23 may include: a planar part 231 and a second guide part 232 arranged around the planar part 231. The second guide part 232 may guide the protruding structure 23 into the recessing structure 22 of another UAV to facilitate vertical stacking of multiple UAVs.

Specifically, the planar part 231 may be the bottom surface of the body 20, and the second guide part 232 may be an inclined plane or a curved surface structure. Through the guiding function of the second guide part 232, the planar part 231 can be guided into the recessing structure 22 on the top of another UAV. This allows the UAV to accurately land on the takeoff and landing platform and stack vertically to achieve high-density storage of the UAV.

In some exemplary embodiments, a bearing platform 201 may also be provided on the top of the body 20. The bearing platform 201 is located between a plurality of arms 21. The bearing platform 201 may be used to cooperate with the planar part 231 of another UAV. The contact area between the bearing platform 201 and the planar part 231 is large, which may reduce the pressure between the upper and lower UAVs, thereby reducing wear and tear when UAVs are stacked.

In the present disclosure, one end of the arm 21 is fixed on the bearing platform 201, and the other end thereof extends in a direction away from the bearing platform 201 and inclined upward. A plurality of the arms 21 surrounds to form a recessing structure 22.

In a specific application, the UAV may generally include multiple arms 21. Each arm 21 can be arranged around the bearing platform 201 on the top of the body 20. In a direction from the bearing platform 201 to an outer edge of the body 20, the arm 21 extends in an inclined upward direction. Therefore, a plurality of inclined and surrounding arms 21 can enclose to form a recessing structure 22 arranged around the bearing platform 201. During the landing of the UAV, the protruding structure 23 at the bottom of the UAV body 20 may slide along the arm 21 to the bearing platform 201; the UAV may accurately land onto the takeoff and landing platform and stacked vertically.

It should be noted that in the drawings of the present disclosure, only the case where the UAV includes four arms 21 is shown. In practical applications, the number of arms 21 of the UAV can be set according to actual conditions. For example, the number of arms 21 may be 3, 5 or 8, etc. The present disclosure does not specifically limit the number of the arms 21 on the UAV.

In some exemplary embodiments, a connecting frame 24 may also be provided between two adjacent arms 21. The shape of the top surface of the connecting frame 24 is adapted to the shape of the top surface of the arm 21. The connecting frame 24 and the arm 21 jointly form the recessing structure 22 to improve the integrity of the recessing structure 22 on the top of the UAV. In this way, during the landing process of the UAV, regardless the upper UAV lands on the arms 21 of the lower UAV or on the connecting frame 24 between the arms 21, the above landing UAV can be guided onto the bearing platform 201 of the UAV below. This further improves the guiding range of the recessing structure 22 on the top of the UAV when the UAV lands, and improves the alignment efficiency when the UAV lands.

It should be noted that, in order to reduce the overall weight of the UAV, the connection frame 24 may have a hollow design.

In some exemplary embodiments, the connecting frame 24 is provided with a third opening 241 and a fourth opening 242. The third opening 241 and the fourth opening 242 may be used to avoid guide rails on the takeoff and landing platform. In practical applications, when the UAV lands on the takeoff and landing platform, the third opening 241 may be sleeved over the guide rail of the first bracket, and the fourth opening 242 may be sleeved over the guide rail of the second bracket. In this way, on the one hand, during the landing process of the UAV, the guide rails on the first bracket and the second bracket may guide the landing of the UAV, which is beneficial to the vertical stacking of the UAV. On the other hand, in the case where the multiple UAVs are vertically stacked on the takeoff and landing platform, by way of inserting the guide rail on the first bracket into the third opening 241 and inserting the guide rail on the second bracket into the fourth opening 242, the guide rails may play a limiting role to prevent the UAV from swaying on the takeoff and landing platform in the circumferential direction. This further improves the stacking reliability of the multiple UAVs on the takeoff and landing platform.

It should be noted that in the present disclosure, only the case where the UAVs are stacked on a takeoff and landing platform containing two brackets is shown. In specific applications, the number of openings on the connecting frame 24 may correspond to the number of brackets on the takeoff and landing platform. For example, where only one bracket is provided on the takeoff and landing platform, an opening can be adaptively provided on the connecting frame 24; in the case where the takeoff and landing platform includes four brackets, four openings may be adaptively provided on the connecting frame 24. The present disclosure does not limit the number of openings on the connecting frame 24.

In some exemplary embodiments, the UAV may also include: a propeller 25 and a propeller protective cover 26. The propeller 25 is fixed on the other end of the arm 21. The propeller protective cover 26 covers the propeller 25 and is used to protect the propeller 25. A guide part is provided on a side of the propeller protective cover 26 close to the arm 21. The guide part may guide the protruding structure 23 of another UAV into the recessing structure 22.

In specific applications, by providing the guide part on the side of the propeller protective cover 26 close to the arm 21, the guide part may serve as a peripheral structure of the recessing structure 22, which further increases the area of the recessing structure 22. In this way, during the landing process of the UAV, whether the upper UAV lands on the arms 21 of the lower UAV or on the propeller protective cover 26 on the periphery of the arm 21, the upper UAV may be guided to the bearing platform 201 of the lower UAV. This further improves the guiding range of the recessing structure 22 on the top of the UAV for another UAV to land, and improves the alignment efficiency of the UAV when it lands. In summary, the UAV described in the embodiments of the present disclosure may at least include the following advantages:

In the present disclosure, by providing one of the protruding structure and the recessing structure at the bottom of the UAV, and the top of the UAV forms the other one of the protruding structure and the recessing structure, the protruding structure may be at least partially embedded within the recessing structure to facilitate vertical stacking of multiple UAVs. Moreover, in the case of vertical stacking of multiple UAVs, for two UAVs adjacent to each other, the protruding structure at the bottom of the upper UAV body may be at least partially embedded in the recessing structure at the top of the lower UAV body to achieve high-density storage of multiple UAVs.

The present disclosure also provides a takeoff and landing (docking) system as shown in FIG. 2 to 4. The takeoff and landing (docking) system may specifically include: the takeoff and landing platform as described in any of the above exemplary embodiments, and the UAV as described in any of the above exemplary embodiments, where there are multiple UAVs. The multiple UAVs can be stacked vertically on the takeoff and landing platform. In the case of landing of the multiple UAVs, the multiple UAVs can be vertically stacked on the takeoff and landing platform. In the case of takeoff of the multiple UAVs, the multiple UAVs can take off from the takeoff and landing platform.

It should be noted that in the present disclosure, the structure of the takeoff and landing platform may be the same as the structure of the takeoff and landing platform in the above exemplary embodiments, and its working principle is also similar, which will not be described again herein. Similarly, the specific structure of the UAV may also be the same as the structure of the UAV in the above exemplary embodiments, and its working principle is also similar, which will not be described again herein.

In the embodiments of the present disclosure, by providing a bracket on the takeoff and landing platform, when multiple UAVs land, the multiple UAVs may be vertically stacked on the bracket along the guide rail. In the case of takeoff of the multiple UAVs, the multiple UAVs may take off from the bracket. That is, the takeoff and landing platform may be used to realize the takeoff and landing of multiple UAVs. In this way, it is possible to avoid manual UAV takeoff site layout, preparation, and landing recovery operations, and reduce manpower and site investment when multiple UAVs perform collaborative operations. It can not only reduce the cost of multiple UAV collaborative operations, but also improve the efficiency of multiple UAV collaborative operations.

The present disclosure also provides a storage device for storing the takeoff and landing platform and UAV.

Figure 18:
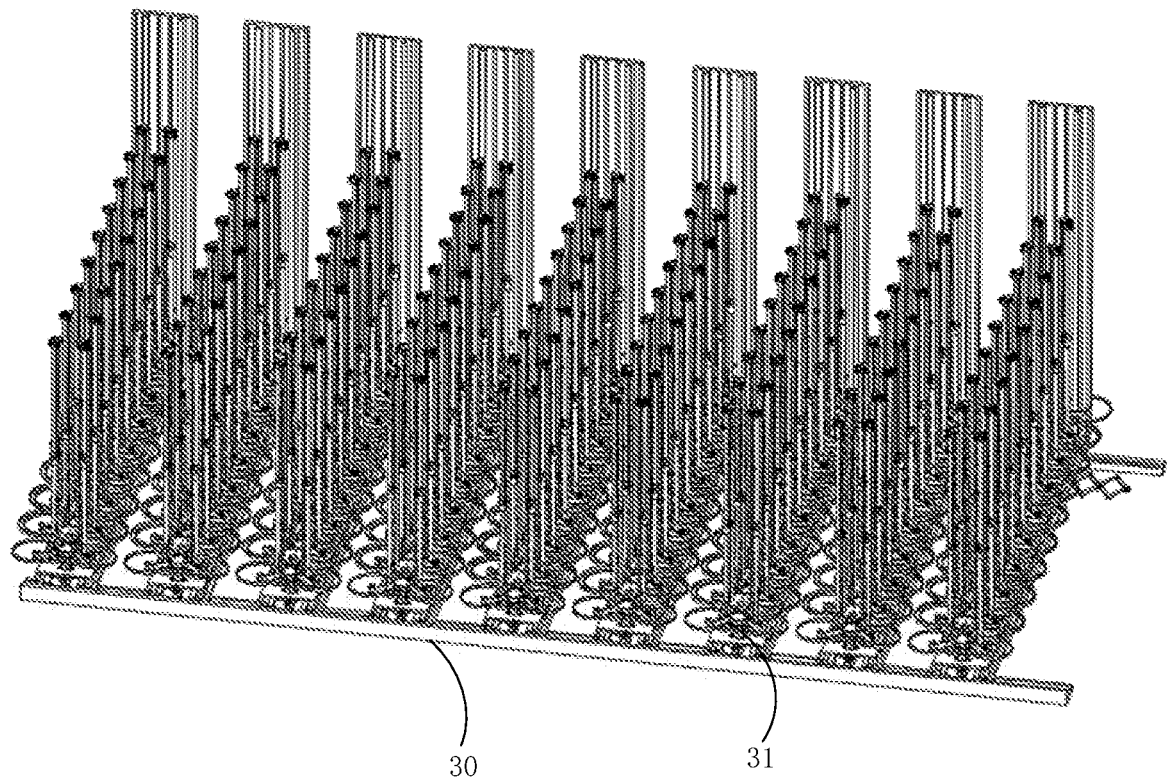
FIG. 18 is a schematic diagram of the structure of a storage device according to some exemplary embodiments of the present disclosure.
Figure 19:
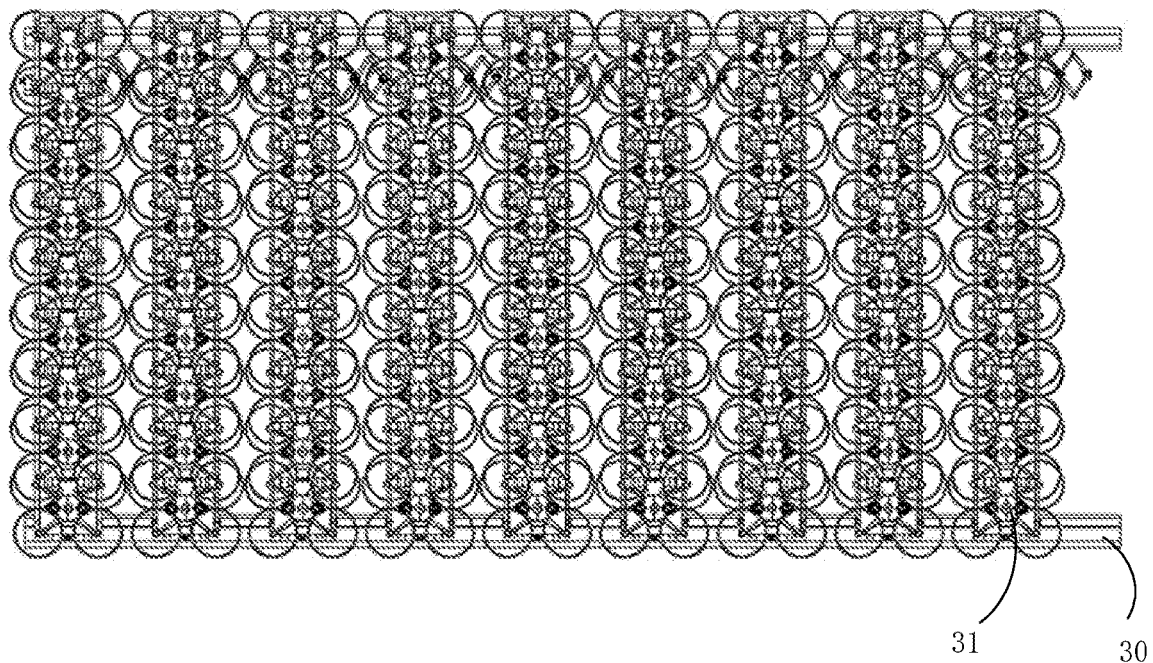
FIG. 19 is a schematic diagram of the structure of the storage device shown in FIG. 18 viewed from another angle.
Figure 20:
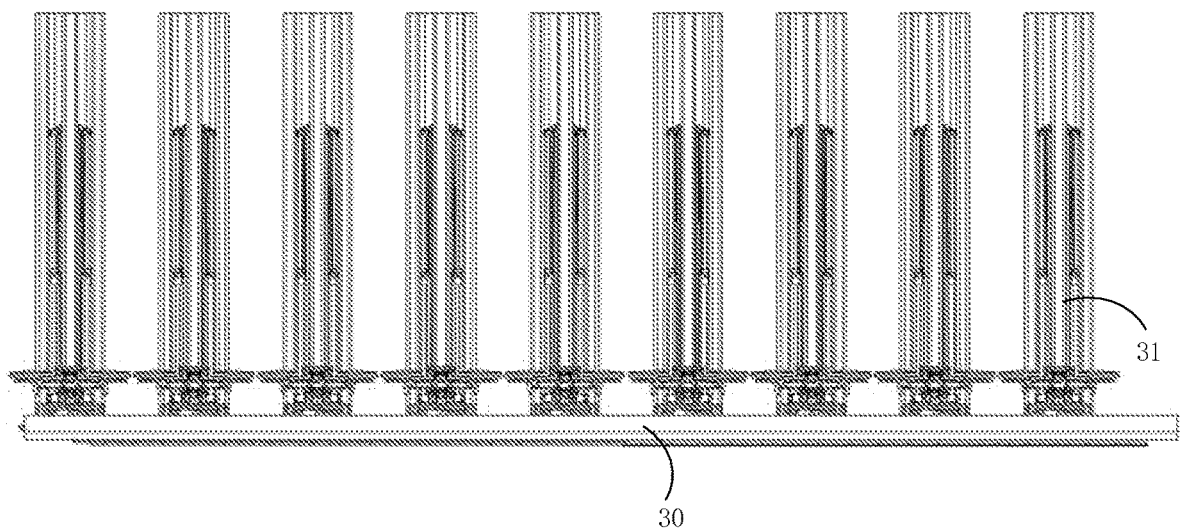
FIG. 20 is a schematic diagram of the structure of the storage device shown in FIG. 18 viewed from another angle.

FIG. 18 is a schematic diagram of the structure of a storage device according to some exemplary embodiments of the present disclosure. FIG. 19 is a schematic diagram of the structure of the storage device shown in FIG. 18 viewed from another angle. FIG. 20 is a schematic diagram of the structure of the storage device shown in FIG. 18 viewed from another angle.

Specifically, the storage device may include: a storage platform 30 and a takeoff and landing platform 31. The number of takeoff and landing platforms 31 is multiple, and the multiple UAVs can be stacked vertically on each takeoff and landing platform 31.

In the present disclosure, the storage platform 30 may be used as the structural main body of the storage device to support multiple takeoff and landing platforms 31. The takeoff and landing platform 31 can vertically stack multiple UAVs to fully utilize the vertical space to accommodate the multiple UAVs. In practical applications, by vertically stacking multiple UAVs on each takeoff and landing platform 31 and placing multiple takeoff and landing platforms 31 on the storage platform 30, high-density storage of the UAVs can be achieved.

In practical applications, multiple takeoff and landing platforms 31 can be placed on the storage platform 30 in the horizontal direction. Multiple UAVs on the takeoff and landing platform 31 can be stacked vertically on the bracket of the takeoff and landing platform 31, so as to make full use of the horizontal space and vertical space of the storage device; high-density storage of the UAV is achieved, so as to facilitate the storage and transportation of the UAVs.

Figure 21:
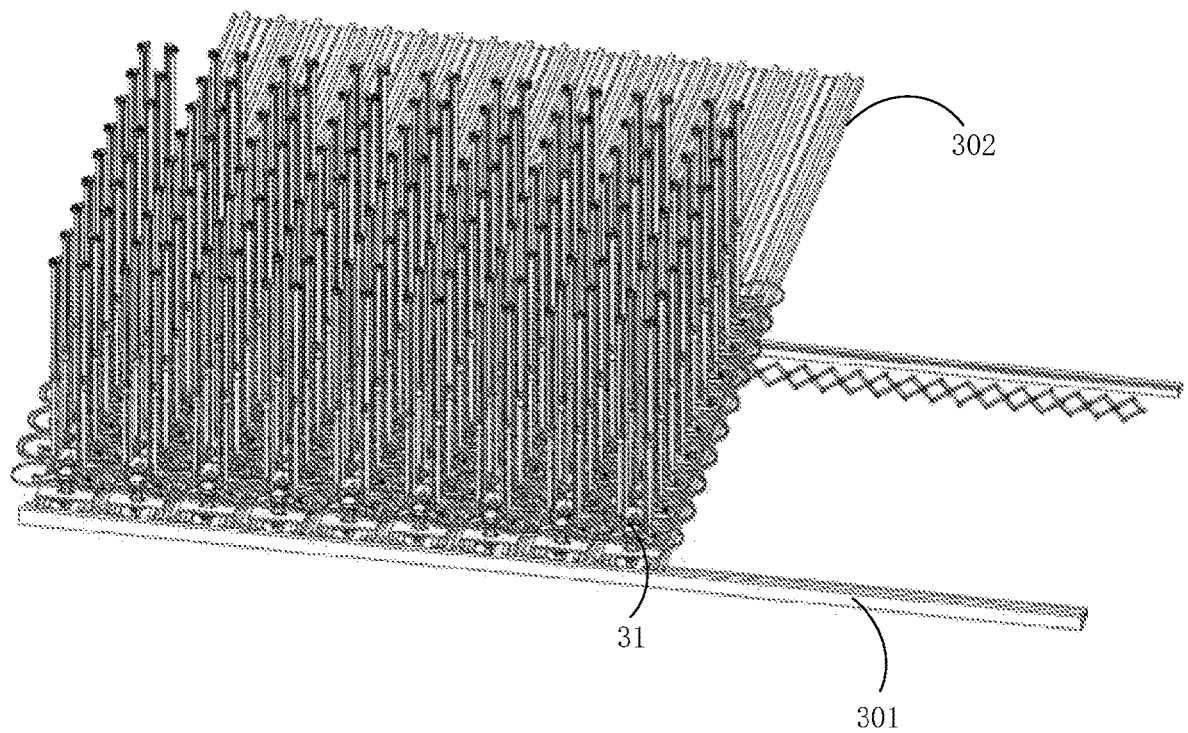
FIG. 21 is a schematic diagram of the structure of a storage device according to some exemplary embodiments of the present disclosure.
Figure 22:
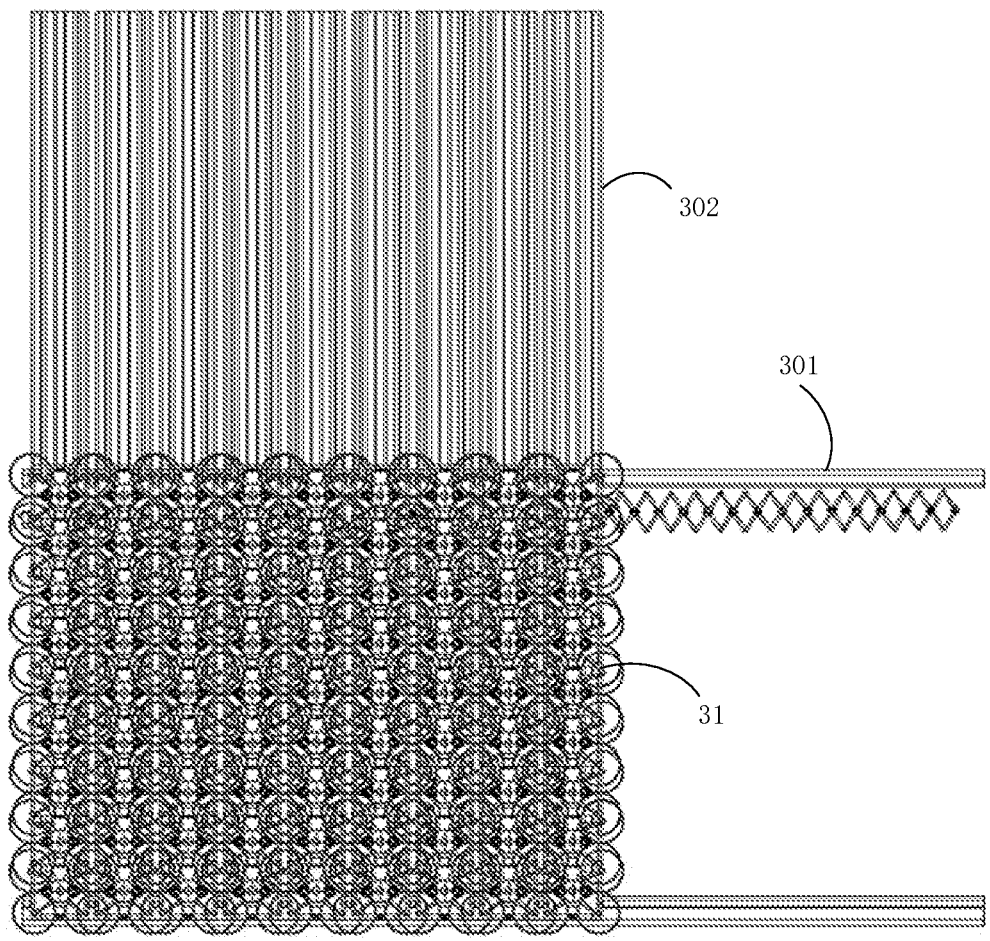
FIG. 22 is a schematic diagram of the structure of the storage device shown in FIG. 21 viewed from another angle.

FIG. 21 is a schematic diagram of the structure of a storage device according to some exemplary embodiments of the present disclosure. FIG. 22 is a schematic diagram of the structure of the storage device shown in FIG. 21 viewed from another angle.

As shown in FIGS. 21 and 22, a plurality of first telescopic frames 301 is provided on the storage platform 30. The telescopic direction of the first telescopic frames 301 is the first direction. Each first telescopic frame 301 is connected with a multiple takeoff and landing platforms 31. The multiple takeoff and landing platforms 31 are movably connected to the first telescopic frame 301 along the first direction to adjust the distance between adjacent takeoff and landing platforms 31.

In specific applications, the first telescopic frame 301 can be deployed along the first direction to facilitate connecting multiple lifting platforms to the first telescopic frame 301. After multiple lifting platforms are connected to the first telescopic frame 301, the first telescopic frame 301 can be retracted along the first direction, so that the distance between two adjacent takeoff and landing platforms 31 in the first direction is shortened, so as to reduce the space occupied by multiple takeoff and landing platforms 31 in the first direction.

Figure 23:
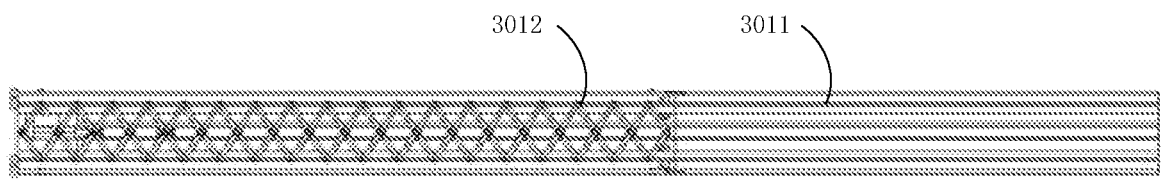
FIG. 23 is a schematic diagram of the structure of a first telescopic frame according to some exemplary embodiments of the present disclosure.

FIG. 23 is a schematic diagram of the structure of a first telescopic frame according to some exemplary embodiments of the present disclosure. As shown in FIG. 23, the first telescopic frame 301 may include: a first frame body 3011 and a first telescopic mechanism 3012. The first telescopic mechanism 3012 is telescopically connected to the first frame body 3011. A plurality of takeoff and landing platforms 31 are connected to the first frame body 3011 to adjust the distance between adjacent takeoff and landing platforms 31 through the expansion and contraction of the first telescopic mechanism 3012.

Specifically, the first frame body 3011 can be used as a structural main body on the first telescopic bracket 301, and the first frame body 3011 can be used to support the takeoff and landing platform 31. The first telescopic mechanism 3012 can be movably connected to the first frame body 3011. Multiple takeoff and landing platforms 31 can be connected to the first frame body 3011 via the first telescopic mechanism 3012. In this way, through the expansion and contraction of the first telescopic mechanism 3012 along the first direction, the distance between two adjacent takeoff and landing platforms 31 in the first direction can be adjusted.

For example, the first frame body 3011 may be a support rod extending along the first direction, and the first telescopic mechanism 3012 may be a spring, a folding hinge, etc. whose telescopic direction is along the first direction. The present disclosure does not limit the first frame body 3011 and the first telescopic mechanism 3012.

In some exemplary embodiments, the storage device may also include a second telescopic frame(s) 302, the direction of the second telescopic frame 302 is a second direction, and the second direction is perpendicular to the first direction. A plurality of first telescopic frames 301 may be sequentially connected to the second telescopic frames 302 at intervals along the second direction to adjust the distance between adjacent first telescopic frames 301.

In the present disclosure, the first direction and the second direction may be perpendicular to each other. For example, a two-dimensional coordinate system may be established on the horizontal plane of the storage platform 30, the first direction may be the horizontal axis direction in the two-dimensional coordinate system, and the second direction may be the vertical axis coordinate in the two-dimensional coordinate system. Alternatively, the first direction may be the vertical axis direction in the two-dimensional coordinate system, and the second direction may be the horizontal axis coordinate in the two-dimensional coordinate system. The present disclosure does not limit this.

In specific applications, the second telescopic frame 302 may be deployed/expanded along the second direction to facilitate connecting multiple takeoff and landing platforms 31 to the second telescopic frame 301. After multiple takeoff and landing platforms 31 are connected to the second telescopic frame 301, the second telescopic frame 302 can be retracted along the second direction, so that the distance between two adjacent takeoff and landing platforms 31 in the second direction becomes shorter, so as to reduce the space occupied by the multiple takeoff and landing platforms 31 in the second direction.

In some exemplary embodiments, the second telescopic frame 301 may include: a second frame body and a second telescopic mechanism. The second telescopic mechanism is telescopically connected to the second frame body. The plurality of first telescopic brackets may be connected to the second frame body to adjust the distance between adjacent second telescopic brackets through telescopic movement of the second telescopic mechanism.

Specifically, the second frame body can be used as a structural main body of the telescopic frame, and the second frame body can be used to support the takeoff and landing platform 31. The second telescopic mechanism can be movably connected to the second frame body, and the plurality of takeoff and landing platforms 31 can be connected to the second frame body via the second telescopic mechanism. In this way, through the expansion and contraction of the second telescopic mechanism along the second direction, the distance between the two adjacent takeoff and landing platforms 31 in the second direction may be adjusted.

For example, the second frame body may be a support rod extending along the second direction. The second telescopic mechanism may be a spring, a folding hinge, etc. with a telescopic direction along the second direction. The present disclosure does not limit the specific second frame body and the second telescopic mechanism.

Specifically, for the specific structure of the second telescopic frame 301, reference may be made to the first telescopic frame 301 shown in FIG. 23, and will not be described again herein.

It should be noted that in specific applications, casters or rollers may be provided at the bottom of the lifting platform to assist the movement of the lifting platform on the storage platform 30, so the distance between the lifting platforms may be adjusted.

In the present disclosure, the storage device may not only be used to store the UAVs, but may also be used for the takeoff and landing of multiple UAVs. Specifically, when the UAV needs to be stored or transported, the first telescopic frame 301 and the second telescopic frame 302 may be retracted, the distance between the takeoff and landing platforms 31 is shortened, and the space occupied by the takeoff and landing platform 31 on the storage platform 30 is reduced, so as to store as many UAVs as possible in the smallest possible space. When it is necessary to use the takeoff and landing platform 31 for UAV takeoff and landing, the first telescopic frame 301 and the second telescopic frame 302 may be deployed to increase the distance between the takeoff and landing platform 31, so that a reasonable distance can be maintained between the takeoff and landing platform 31 to facilitate the takeoff or landing of the UAVs.

In some exemplary embodiments, the UAVs may also be linked with the expansion and contraction of the takeoff and landing platform 31. For example, when the distance between the takeoff and landing platform 31 becomes shorter, the UAVs on the takeoff and landing platform 31 may be automatically folded and stored to avoid interference between the UAVs on the takeoff and landing platform 31. In another example, when the distance between the takeoff and landing platform 31 becomes larger, the UAVs on the takeoff and landing platform 31 may perform takeoff operations. Moreover, the UAVs on two adjacent takeoff and landing platforms 31 may take off at different times to provide the required headroom when the UAVs take off.

In summary, the storage device according to the present disclosure may at least have the following advantages:

In the present disclosure, the storage platform may be used as the structural body of the storage device to support multiple takeoff and landing platforms. The takeoff and landing platform can vertically stack multiple UAVs to fully utilize the vertical space to accommodate the multiple UAVs. In practical applications, by stacking multiple UAVs vertically on each takeoff and landing platform and placing multiple takeoff and landing platforms on the storage platform, high-density storage of the UAVs can be achieved.

The present disclosure also provides a takeoff and landing control method, which is applied to the main control device.

Figure 24:
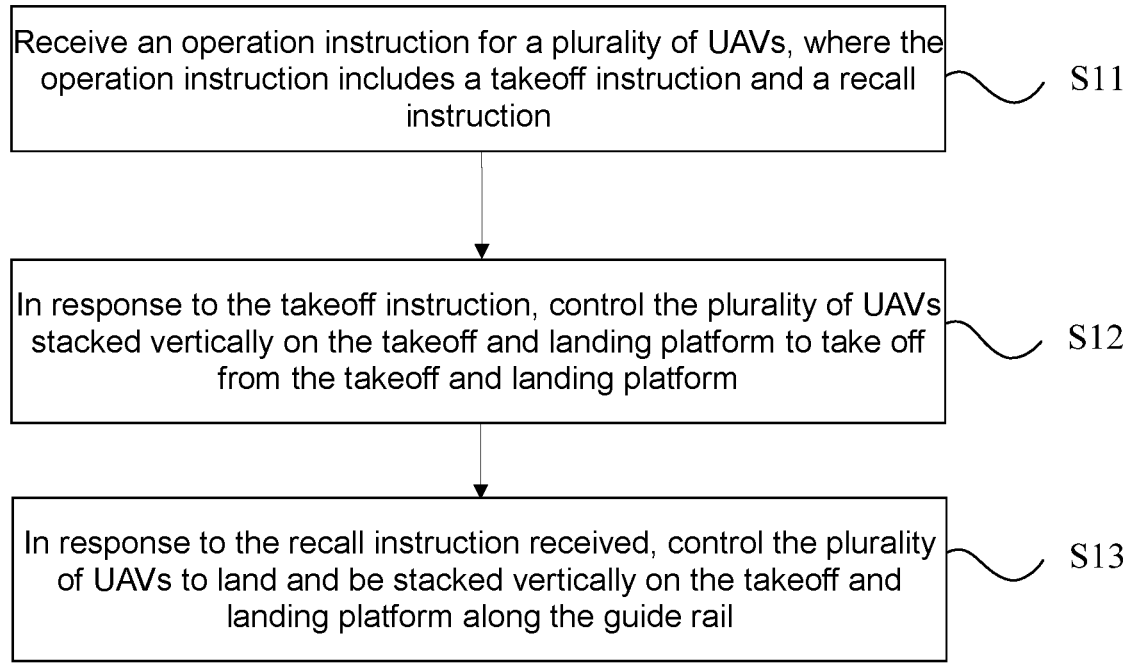
FIG. 24 is a schematic diagram of a step flow chart of a takeoff and landing control method according to some exemplary embodiments of the present disclosure.

FIG. 24 is a schematic diagram of a step flow chart of a takeoff and landing control method according to some exemplary embodiments of the present disclosure. The takeoff and landing control method may specifically include the following steps:

Step S11: Receive an operation instruction for a plurality of UAVs, where the operation instruction includes a takeoff instruction and a recall instruction.

In the present disclosure, the main control device may be a device used to control the takeoff and landing platform and the UAV to perform related operations, The main control device includes but is not limited to any one of a computer, a console, or a remote control, and the present disclosure does not limit the specific main control device.

Specifically, the communication connection between the main control device and the takeoff and landing platform may be realized through a wired connection or a wireless connection. The communication connection between the main control device and the UAV can be realized through wireless connection. Based on the communication connection between the main control device, the takeoff and landing platform and the UAV, the main control device may send control instructions to the takeoff and landing platform and the UAV to control the takeoff and landing platform or the UAV to perform relevant operations. In some exemplary embodiments, the main control device may be integrated into the takeoff and landing platform. In some exemplary embodiments, the main control device may be one of the multiple UAVs.

In the present disclosure, the main control device may be provided with an instruction receiving device, and the instruction receiving device may be used for the operation instructions for multiple UAVs. The instruction receiving device may include, but is not limited to, at least one of a touch screen, a button, or a voice recognition module. In specific applications, users may issue operation instructions for the UAV through touch operations on the touch screen, pressing or rotating operations on buttons, and by voice.

Specifically, the operation instructions may include takeoff instructions and recall instructions. The takeoff instructions may be used to control the UAV to take off from the takeoff and landing platform; the recall command may be used to recall the UAV and vertically stack the plurality of UAVs on the bracket of the takeoff and landing platform.

Step S12: In response to the takeoff instruction, control the plurality of UAVs stacked vertically on the takeoff and landing platform to take off from the takeoff and landing platform.

In the present disclosure, after receiving a takeoff instruction for the UAVs, the main control device may control multiple UAVs vertically stacked on the takeoff and landing platform to take off from the takeoff and landing platform in response to the takeoff instruction. In specific applications, when there are multiple UAVs stacked vertically on the takeoff and landing platform, the main control device may control the multiple UAVs to take off in sequence from top to bottom.

Specifically, the takeoff and landing platform may be provided with a first charging module. The first charging module is electrically connected to the second charging module on the UAV to charge the UAV. In practical applications, before controlling the UAVs to take off, the UAVs should be controlled to release/disconnect the electrical connection with the first charging module, in order to facilitate the UAVs to perform takeoff operations and take off from the takeoff and landing platform.

In some exemplary embodiments, the method of controlling multiple UAVs stacked vertically on a takeoff and landing platform to take off from the takeoff and landing platform may specifically include the following sub-steps:

First, control the plurality of UAVs stacked vertically on the takeoff and landing platform to rotate their propellers to a hovering state.

In the present disclosure, when it is necessary to control the plurality of UAVs on the takeoff and landing platform to take off, the propellers of the plurality of UAVs stacked vertically on the takeoff and landing platform may be controlled to start rotating to provide a lifting force to the UAVs. Specifically, before taking off from the takeoff and landing platform, all UAVs on the takeoff and landing platform can be controlled to rotate their propellers to a hovering state. In practical applications, when the UAVs are in the hovering state, the UAVs are in a state that can take off.

Specifically, the hovering state may be as follows: the lifting force generated by the rotation of the propellers on the UAV is not enough to enable the UAV to complete a full take-off action; however, the UAV can maintain a stable attitude (the attitude may include a horizontal attitude and an attitude in a rotational direction) and move along the guidance feature with a point of support below.

In the present disclosure, by controlling the propellers of the plurality of UAVs stacked vertically on the takeoff and landing platform to the hovering state, the plurality of UAVs on the takeoff and landing platform may be controlled in a takeoff-ready state.

Next, the takeoff and landing platform is controlled to push the multiple UAVs out of the takeoff and landing platform in sequence, and control the pushed-out UAVs to take off.

In the present disclosure, after controlling the plurality of UAVs on the takeoff and landing platform to rotate the propellers thereof to reach the hovering state, the main control device may control the takeoff and landing platform based on the communication connection between the main control device and the takeoff and landing platform to push the multiple UAVs out of the takeoff and landing platform in sequence, and based on the communication connection between the main control device and the UAV, control the pushed-out UAVs to take off.

Specifically, after controlling the plurality of UAVs on the takeoff and landing platform to rotate the propellers thereof to reach the hovering state, the main control device may control the lifting module on the takeoff and landing platform to lift the plurality of UAVs by the height of one UAV, so the uppermost UAV is pushed out of the takeoff and landing platform, and then the pushed-out UAV is controlled to take off. Next, the above steps are performed in a loop in an order of from top to bottom; the UAVs on the takeoff and landing platform are sequentially pushed out from the takeoff and landing platform and to take off. This enables the plurality of UAVs on the takeoff and landing platform to be pushed out in sequence to take off one after another, thereby achieving continuous takeoff to reach their destination.

In the present disclosure, by the method including controlling the plurality of UAVs stacked vertically on the takeoff and landing platform to rotate the propellers thereof to reach a hovering state, then controlling the takeoff and landing platform to push the plurality of UAVs out of the takeoff and landing platform in sequence, and controlling the pushed out UAV to take off, since the UAV is already in a hovering state on the takeoff and landing platform and is ready to take off, after being pushed out from the takeoff and landing platform, the UAV can take off quickly, so that the plurality of UAVs may take off continuously, and the takeoff efficiency is high.

In some exemplary embodiments, the controlling of the plurality of UAVs stacked vertically on a takeoff and landing platform to take off from the takeoff and landing platform may specifically include the following sub-steps:

First, control the takeoff and landing platform to push out the UAVs stacked vertically in a propeller stopping state.

In some exemplary embodiments, when it is necessary to control the takeoff of the plurality of UAVs from the takeoff and landing platform, the takeoff and landing platform may be controlled first to push the topmost UAV among the UAVs that are vertically stacked in the propeller stopping state out from the takeoff and landing platform.

Specifically, the main control device may control the lifting module of the takeoff and landing platform to lift the UAV by the height of the body, so as to push all UAVs on top of the takeoff and landing platform out of the takeoff and landing platform.

Next, control the pushed out UAV to take off.

In the present disclosure, after pushing the uppermost UAV on the takeoff and landing platform out from the takeoff and landing platform, the main control device may control the propellers of the pushed out UAV to rotate to take off. Then, the above steps are performed in a loop until all UAVs on the takeoff and landing platform are taken off in an order from top to bottom.

Specifically, since the UAV controls the UAV's propellers to rotate after the UAV is pushed out from the takeoff and landing platform, this can prevent the UAV from rotating its propellers on the takeoff and landing platform, so as to avoid interference between the UAV propellers and the takeoff and landing platform to the greatest extent, and improve the takeoff safety of the UAV.

In some exemplary embodiments, the controlling of the plurality of UAVs stacked vertically on the takeoff and landing platform to take off from the takeoff and landing platform may specifically include the following sub-steps:

First, control the takeoff and landing platform to push out the plurality of vertically stacked UAVs.

In the present disclosure, when it is necessary to control the plurality of UAVs on the takeoff and landing platform to take off, the main control device may first control the takeoff and landing platform to push all UAVs vertically stacked on the takeoff and landing platform out of the takeoff and landing platform.

Specifically, the main control device may control the lifting module of the takeoff and landing platform to lift the plurality of UAVs to reach a higher height, until all UAVs on the takeoff and landing platform are pushed out of the takeoff and landing platform. Then, the plurality of UAVs may be controlled to rotate the propellers thereof to reach a hovering state.

In the present disclosure, after all UAVs on the takeoff and landing platform are pushed out of the takeoff and landing platform, the main control device shown may control the propellers of the plurality of UAVs to rotate, so that the plurality of UAVs rotate the propellers thereof to reach a hovering state. That is, the plurality of UAVs pushed out the takeoff and landing platform are placed in a takeoff-ready state.

Finally, the plurality of UAVs in the hovering state is controlled to take off simultaneously.

In the present disclosure, when the plurality of UAVs is pushed out of the takeoff and landing platform and rotate their propellers to reach a hovering state, the main control device may control the plurality of UAVs in the hovering state to take off at the same time, and reach their target locations, thus the takeoff efficiency is extremely high.

Specifically, the takeoff and landing platform is controlled to push out the plurality of vertically stacked UAVs, the plurality of UAVs are controlled to rotate their propellers to reach a hovering state, and finally the plurality of UAVs in the hovering state are controlled to take off at the same time. This may prevent the UAVs from rotating their propellers on the takeoff and landing platform, so as to avoid interference between the UAV propellers and the takeoff and landing platform to the greatest extent, and improve the takeoff safety of the UAVs. Moreover, it can also achieve higher take-off efficiency.

It should be noted that in specific applications, a person skilled in the art may use the method described in any of the above exemplary embodiments to control multiple UAVs stacked vertically on the takeoff and landing platform to take off. The present disclosure does not specifically limit the takeoff method of the UAVs from the takeoff and landing platform.

Step S13: In response to the recall instruction received, control the plurality of UAVs to land and be stacked vertically on the takeoff and landing platform along the guide rail.

In the present disclosure, after the main control device receives the recall instruction for the UAV, in response to the recall instruction, the plurality of UAVs may be controlled to land and be stacked vertically on the takeoff and landing platform along the guide rail. In specific applications, when recalling the multiple UAVs, the first recalled UAV may be stacked at the bottom of the takeoff and landing platform.

In some exemplary embodiments, the controlling of the plurality of UAVs to land and be stacked vertically on the takeoff and landing platform along the guide rail may specifically include the following sub-steps:

First, recall the UAVs to the top of the takeoff and landing platform and switch to the hovering state.

In the present disclosure, when the UAVs need to be recalled, the main control device may control a first UAV to land within the range of the guide carrier plate of the takeoff and landing platform through precise landing, and reduce the propeller speed of the UAV, causing the UAV to switch from a flying state to a hovering state.

In practical applications, a first identity mark may be provided on the guide carrier plate of the takeoff and landing platform. During the landing process, the UAV may accurately land within the range of the guide carrier board by identifying the first identity mark on the guide carrier board. The first identity mark may include, but is not limited to, image marks such as QR codes, or contour features such as protrusions or recesses. The present disclosure does not specifically limit the first identity identifier.

Next, after each UAV is determined to be in a hovering state, the UAVs are controlled to land and stack vertically on the takeoff and landing platform along the guide rail.

In the present disclosure, after determining that one of the UAVs has landed within the range of the guide carrier plate of the takeoff and landing platform and is in a hovering state, the UAV may be controlled to further descend and stack on the takeoff and landing platform along the guide rail.

In practical applications, since the guide carrier plate includes a lower recess part and a first guide part, the lower recess part is arranged in the central area of the guide carrier plate, and the first guide part is arranged in the edge area of the guide carrier plate and surrounds the lower recess part. When the UAV lands on the guide carrier plate is in a hovering state, the bottom of the UAV may slide along the first guide part until the UAV lands on the lower recess part in the central area of the guide carrier plate to complete the landing process of the UAV.

In the present disclosure, after the first UAV lands on the guide carrier plate of the takeoff and landing platform, the main control device may control the guide carrier plate to lower by the height of the UAV body to recover the UAV on the guide carrier plate into the takeoff and landing platform. Next, the above steps are repeated to recall the second UAV to the range of the takeoff and landing platform and control the UAV to switch to the hovering state.

Specifically, during the landing process of the second UAV, the position of the first UAV that has landed on the takeoff and landing platform can be referenced to perform precise landing. In practical applications, a second identity mark can be provided on each UAV. By identifying the second identity mark on the UAV, another UAV may be controlled to accurately land within the range of the UAV. The second identity mark may include, but is not limited to, image marks such as QR codes, or contour features such as protrusions or recesses. The present disclosure does not specifically limit the second identity mark.

In practical applications, since the protruding structure is set at the bottom of the UAV and the recessing structure is set at the top of the UAV, in the event that the bottom of the second UAV lands within range of the first UAV and is in a hovering state, the protruding structure at the bottom of the upper UAV may slide along the recessing structure at the top of the lower UAV until the upper UAV lands on the bearing platform at the top of the lower UAV to complete the landing process of the second UAV.

In the present disclosure, after the second UAV lands on the first UAV on the takeoff and landing platform, the main control device may control the guide carrier plate to lower by the height of the UAV body to recover the second UAV to the takeoff and landing platform. Next, the landing steps of the second UAV are repeated until all UAVs are recalled and stacked vertically on the takeoff and landing platform along the guide rail.

In some exemplary embodiments, the controlling of the plurality of UAVs to land and stack vertically on the takeoff and landing platform along the guide rail may specifically include the following sub-steps:

First, recall the plurality of UAVs simultaneously to the top of the takeoff and landing platform and switch to a hovering state and arranged vertically in the vertical direction.

In the present disclosure, when the UAV needs to be recalled, the main control device can simultaneously recall the plurality of UAVs to the top of the takeoff and landing platform, arrange the plurality of UAVs in a vertical direction in an order of from top to bottom, and arrange the plurality of UAVs in a vertical direction; the UAV switches to the hovering state.

Specifically, in practical applications, the UAV arranged at the bottom may land within the range of the guide carrier plate of the takeoff and landing platform by precise landing. For specific implementation methods, reference may be made to the descriptions in the foregoing exemplary embodiments and will not be described again herein. Counting from bottom to top, the second UAV may accurately land on the top of the first UAV based on the position of the first UAV. For specific implementation methods, reference may also be made to the descriptions in the foregoing exemplary embodiments and will not be described again herein, and so on, until the UAVs are arranged vertically on the takeoff and landing platform, and all UAVs are switched to the hovering state.

In the present disclosure, the UAV arranged at the bottom can land on the guide carrier plate of the takeoff and landing platform. The guide carrier plate includes a lower recess part and a first guide part. The lower recess part is arranged in the central area of the guide carrier plate, and the first guide part is disposed at an edge area of the guide carrier plate and surrounds the lower recess part. When the UAV landed on the guide carrier plate is in a hovering state, the bottom of the UAV may slide along the first guide part until the UAV lands on the lower recess part in the central area of the guide carrier plate to complete the landing process of the UAV.

For two UAVs adjacent to each other, the upper UAV may land on the top of the lower UAV. A protruding structure is provided at the bottom of the UAV, and a recessing structure is set at the top of the UAV. Therefore, in the case where the bottom of the upper UAV comes within range of the lower UAV and is in a hovering state, the protruding structure at the bottom of the upper UAV can slide along the recessing structure at the top of the lower UAV until the upper UAV lands on the bearing platform at the top of the lower UAV, completing the landing of the upper UAV. By executing the above method in a loop, the plurality of UAVs may be vertically stacked above the takeoff and landing platform.

For example, in the case where 16 UAVs need to be stacked vertically on the takeoff and landing platform, these 16 UAVs can be recalled to the top of the takeoff and landing platform at the same time. The 16 UAVs may be arranged vertically in a vertical direction and can be switched to a hovering state.

Next, the multiple UAVs in the hovering state are controlled to land sequentially and stacked vertically on the takeoff and landing platform along the guide rail.

In the present disclosure, when the main control device controls the plurality of UAVs to be arranged vertically in the vertical direction and switched to the hovering state, the main control device may control the guide carrier plate of the takeoff and landing platform to descend to simultaneously recover the multiple UAVs to the takeoff and landing platform.

It should be noted that in specific applications, a person skilled in the art can recall multiple UAVs according to the method described in any of the above exemplary embodiments, and control the multiple UAVs to be vertically stacked on the takeoff and landing platform. The present disclosure does not specifically limit the manner in which the UAV lands on the takeoff and landing platform.

Figure 25:
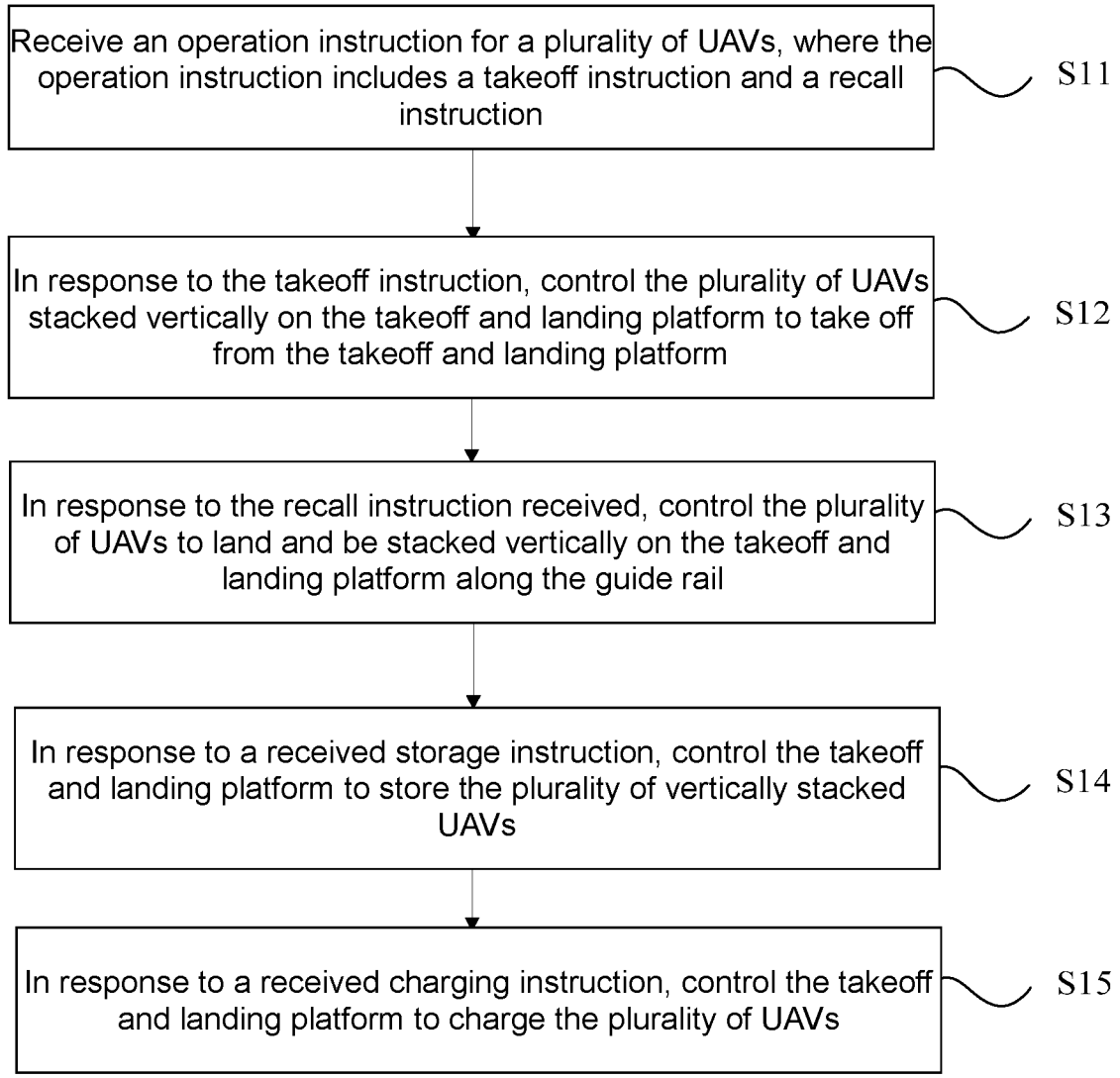
FIG. 25 is a schematic diagram of a step flow chart of a takeoff and landing control method according to some exemplary embodiments of the present disclosure.

FIG. 25 is a schematic diagram of a step flow chart of a takeoff and landing control method according to some exemplary embodiments of the present disclosure. As shown in FIG. 25, after step S13, the takeoff and landing control method may also include the following steps:

Step S14: In response to a received storage instruction, control the takeoff and landing platform to store the plurality of vertically stacked UAVs.

In the present disclosure, the operation instruction may also include a storage instruction. When stacking the plurality of UAVs vertically on the takeoff and landing platform, the main control device may receive the storage instruction; in response to the storage instruction, the takeoff and landing platform may be controlled to store the plurality of vertically stacked UAVs so as to store the plurality of UAVs onto the takeoff and landing platform. The space occupied by the plurality of UAVs on the takeoff and landing platform may be minimized.

Specifically, the main control device may control the guide carrier plate on the takeoff and landing platform to descend to the lowest point of the takeoff and landing platform, so as to achieve the storage of the plurality of UAVs and facilitate the transportation of the takeoff and landing platform and the plurality of UAVs on it.

Step S15: In response to a received charging instruction, control the takeoff and landing platform to charge the plurality of UAVs.

In the present disclosure, the storage instruction may also include a charging instruction. When stacking the plurality of UAVs vertically on the takeoff and landing platform, the main control device receives the charging instruction. In response to the charging instruction, the takeoff and landing platform may be controlled to charge the plurality of vertically stacked UAVs to improve the endurance of the plurality of UAVs on the takeoff and landing platform.

Specifically, the takeoff and landing platform may be provided with a first charging module(s), and one of the first charging module(s) may be electrically connected to a second charging module of the UAV to charge the UAV.

In the present disclosure, the body height of the UAV is the first height; the vertical interval between two adjacent first charging modules is a first interval, and the first interval is greater than the first height. Therefore, in the event that the UAV on the takeoff and landing platform needs to be charged, the interval between two adjacent UAVs may be adjusted so that the interval between two adjacent UAVs is equal to the first interval, so that the first charging module on the takeoff and landing platform and the second charging module on the UAV are aligned one by one to facilitate electrical connection between the two.

In summary, the takeoff and landing control method described in the exemplary embodiment of the present disclosure may specifically include the following advantages:

In the present disclosure, the main control device may receive an operation instruction for the plurality of UAVs, where the operation instruction may include a takeoff instruction and a recall instruction. In response to the takeoff instruction, the plurality of UAVs stacked vertically on the takeoff and landing platform is controlled to take off from the takeoff and landing platform. In response to the received recall instruction, the plurality of UAVs are controlled to land and vertically stack on the takeoff and landing platform along the guide rail to achieve takeoff and landing of the plurality of UAVs on the takeoff and landing platform. In this way, it is possible to avoid manual UAV take-off site layout, preparation, and landing recovery operations, and reduce manpower and site investment when multiple UAVs perform collaborative operations. It can not only reduce the cost of multiple UAV collaborative operations, but also improve the efficiency of multiple UAV collaborative operations.

The present disclosure also provides a takeoff and landing control method, which can be used for the takeoff and landing platform described in the above exemplary embodiments.

Figure 26:
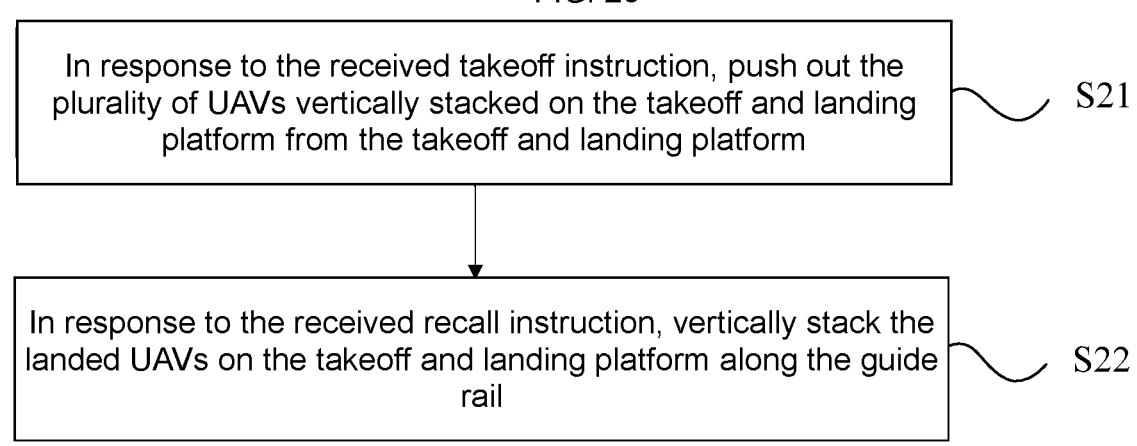
FIG. 26 is a schematic diagram of a step flow chart of a takeoff and landing control method according to some exemplary embodiments of the present disclosure.

FIG. 26 is a schematic diagram of a step flow chart of a takeoff and landing control method according to some exemplary embodiments of the present disclosure. As shown in FIG. 26, the takeoff and landing control method may specifically include the following steps:

Step S21: In response to the received takeoff instruction, push out the plurality of UAVs vertically stacked on the takeoff and landing platform from the takeoff and landing platform.

In the present disclosure, after receiving the operation instruction for the UAV, the main control device may send the operation instruction to the takeoff and landing platform. Specifically, the operation instruction may include a takeoff instruction and a recall instruction. The takeoff instruction may be used to control the UAV to take off from the takeoff and landing platform; the recall instruction may be used to recall the UAV and vertically stack a plurality of UAVs on the bracket of the takeoff and landing platform.

In practical applications, after receiving the takeoff instruction sent by the main control device, the takeoff and landing platform may control the guide carrier plate to move upward to push out multiple UAVs vertically stacked on the takeoff and landing platform from the takeoff and landing platform, so as to facilitate the takeoff of the multiple UAVs from the takeoff and landing platform.

It should be noted that the speed at which the takeoff and landing platform push out the UAV needs to be determined based on the takeoff mode of the UAV. For details, reference may be made to the foregoing exemplary embodiments, and the present disclosure does not describe it in detail.

Step S22: In response to the received recall instruction, vertically stack the landed UAVs on the takeoff and landing platform along the guide rail.

In the present disclosure, after receiving the recall instruction sent by the main control device, the takeoff and landing platform, after the plurality of UAVs land on the guide carrier plate, control the guide carrier plate to move downward to stack the plurality of UAVs vertically on the takeoff and landing platform along the guide rail of the takeoff and landing platform, so as to land the plurality of UAVs onto the takeoff and landing platform.

It should be noted that the speed at which the takeoff and landing platform takes back the UAV needs to be determined according to the recall mode of the UAV. For details, reference may be made to the aforementioned exemplary embodiments. The present disclosure does not elaborate on this.

Figure 27:
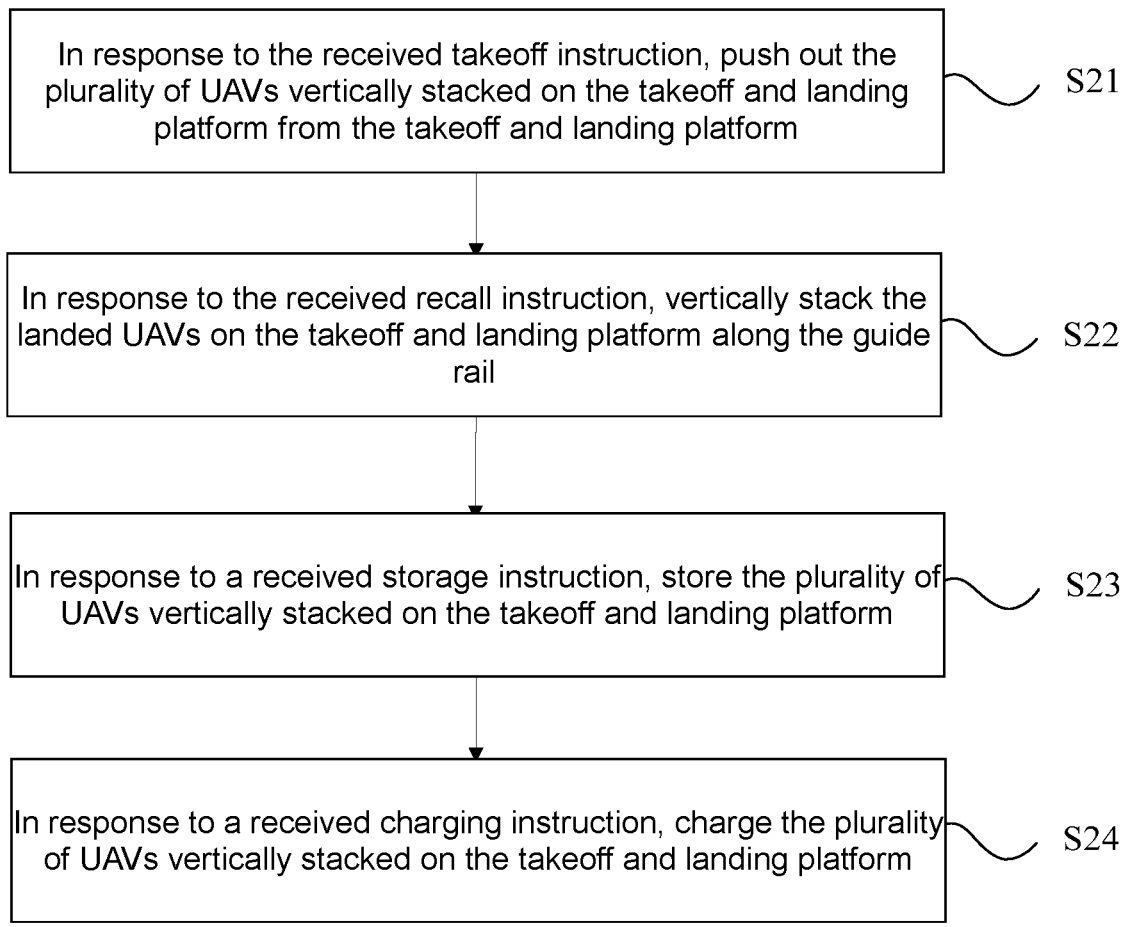
FIG. 27 is a schematic diagram of a step flow chart of a takeoff and landing control method according to some exemplary embodiments of the present disclosure.

FIG. 27 is a schematic diagram of a step flow chart of a takeoff and landing control method according to some exemplary embodiments of the present disclosure. As shown in FIG. 27, after step 22, the takeoff and landing control method may also include the following steps:

Step S23: In response to a received storage instruction, store the plurality of UAVs vertically stacked on the takeoff and landing platform.

In the present disclosure, the operation instruction may also include a storage instruction. In the case of stacking the plurality of UAVs vertically on the takeoff and landing platform, when the takeoff and landing platform receives a storage instruction sent by the main control device, in response to the storage instruction, the plurality of vertically stacked UAVs may be controlled to be stored, so as to store the plurality of UAVs onto the takeoff and landing platform. Thus, the space occupied by the plurality of UAVs on the takeoff and landing platform is minimized.

Specifically, when the takeoff and landing platform receives the takeoff instruction sent by the main control device, the takeoff and landing platform may be controlled to lower the vertically stacked plurality of UAVs to a storage position to achieve storage of the plurality of UAVs, and facilitate transportation of the takeoff and landing platform and the plurality of UAVs on it.

For example, the storage position may be a position where the guide carrier plate descends to the lowest point of the takeoff and landing platform.

Step S24: In response to a received charging instruction, charge the plurality of UAVs vertically stacked on the takeoff and landing platform.

In the present disclosure, the storage instruction may also include a charging instruction. When stacking the plurality of UAVs vertically on the takeoff and landing platform, the main control device may receive a charging instruction, and the takeoff and landing platform may be controlled to charge the plurality of vertically stacked UAVs in response to the charging instruction, so as to improve the endurance of the plurality of UAVs on the takeoff and landing platform.

Specifically, the takeoff and landing platform may be provided with a first charging module(s), and one of the first charging modules may be electrically connected to a second charging module of the UAV to charge the UAV.

In the present disclosure, the height of the UAV's body is the first height, and the vertical interval between two adjacent first charging modules is the first interval. The first interval is greater than the first height. Therefore, in the event that the UAV on the takeoff and landing platform needs to be charged, the interval between two adjacent UAVs may be adjusted so that the interval between two adjacent UAVs is equal to the first interval, so that the first charging module on the takeoff and landing platform and the second charging module on the UAV may be aligned one by one to facilitate electrical connection between the two.

In summary, the takeoff and landing control method described in the present disclosure may at least have the following advantages:

In the present disclosure, the takeoff and landing platform may respond to a received takeoff instruction by pushing out the plurality of UAVs vertically stacked on the takeoff and landing platform from the takeoff and landing platform, and in response to a received recall instruction, vertically stack the landed UAVs on the takeoff and landing platform along the guide rail, so as to achieve takeoff and landing of the plurality of UAVs on the takeoff and landing platform. In this way, it is possible to avoid manual UAV take-off site layout, preparation, and landing recovery operations, and reduce manpower and site investment when multiple UAVs perform collaborative operations. It may not only reduce the cost of multiple UAV collaborative operations, but also improve the efficiency of multiple UAV collaborative operations.

The present disclosure further provides a takeoff and landing control method, which may be applied to the UAVs in the above exemplary embodiments.

Figure 28:
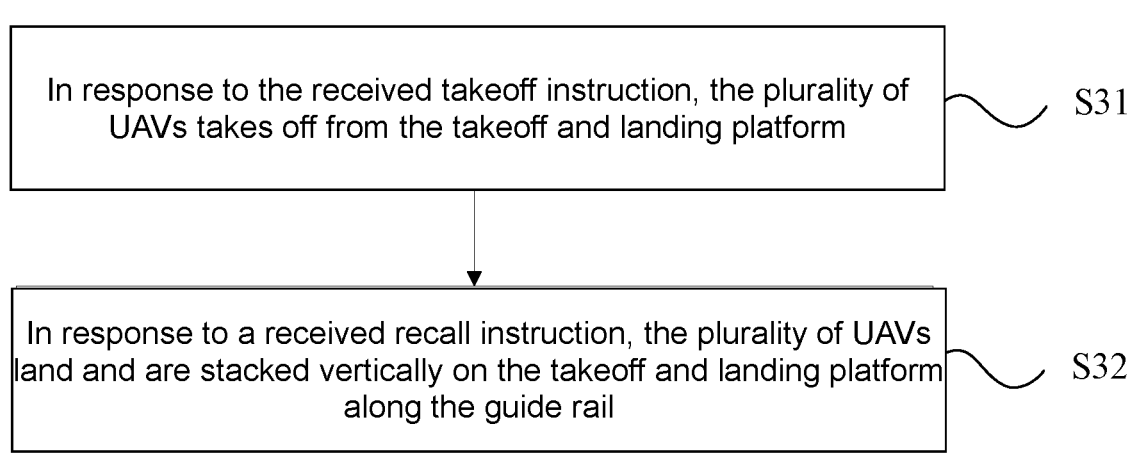
FIG. 28 is a schematic diagram of a step flow chart of a takeoff and landing control method according to some exemplary embodiments of the present disclosure.

FIG. 28 is a schematic diagram of a step flow chart of a takeoff and landing control method according to some exemplary embodiments of the present disclosure. As shown in FIG. 28, the takeoff and landing control method may specifically include the following steps:

Step S31: In response to the received takeoff instruction, the plurality of UAVs takes off from the takeoff and landing platform.

In the present disclosure, after receiving the operation instruction for the UAV, the main control device may send the operation instruction to the UAV. Specifically, the operation instruction may include a takeoff instruction and a recall instruction. The takeoff instruction be used to control the UAV to take off from the takeoff and landing platform, and the recall instruction may be used to recall the UAV and vertically stack the plurality of UAVs on the bracket of the takeoff and landing platform.

In practical applications, the UAV takes off from the takeoff and landing platform after receiving a takeoff instruction sent by the main control device.

In some exemplary embodiments, the method for the plurality of UAVs to take off from the takeoff and landing platform may include the following sub-steps:

First, the plurality of UAVs stacked vertically on the takeoff and landing platform rotate their propellers to reach a hovering state.

In the present disclosure, under the control of the main control device, the propellers of the plurality of UAVs stacked vertically on the takeoff and landing platform can may to rotate to provide a lifting force for the UAV. Specifically, before flying out of the takeoff and landing platform, all UAVs on the takeoff and landing platform may rotate to reach a hovering state. In practical applications, when the UAV is in the hovering state, the UAV is in a state ready to take off.

Next, as pushed by the takeoff and landing platform, the plurality of UAVs is pushed out from the takeoff and landing platform in sequence, and the pushed-out UAVs may take off.

In the present disclosure, after the plurality of UAVs on the takeoff and landing platform rotate the propellers thereof to reach the hovering state, the takeoff and landing platform may push the plurality of UAVs out of the takeoff and landing platform in sequence. Under the influence of the takeoff and landing platform, the plurality of UAVs is pushed out from the takeoff and landing platform in sequence, and the pushed-out UAVs may take off.

Specifically, after the plurality of UAVs on the takeoff and landing platform rotate the propellers thereof to reach the hovering state, the lifting module on the takeoff and landing platform may lift the plurality of UAVs by the height of one UAV to push the uppermost UAV out of the takeoff and landing platform. The takeoff operation may be performed after the UAV is pushed out of the takeoff and landing platform. Next, the above steps is performed repeatedly, in an order of from top to bottom, the UAVs on the takeoff and landing platform are pushed out of the takeoff and landing platform and then perform the takeoff operation. This enables the plurality of UAVs on the takeoff and landing platform to be pushed out and take off one after another, achieving continuous takeoff and reaching the destination.

In the present disclosure, since the UAV is already in a hovering state on the takeoff and landing platform and can take off, after being pushed out from the takeoff and landing platform, the UAV can take off quickly. In this way, the continuous takeoff of the plurality of UAVs can be achieved, and the takeoff efficiency is high.

In some exemplary embodiments, the method for the plurality of UAVs to take off from the takeoff and landing platform may include the following sub-steps:

First, the UAVs that are vertically stacked and in a propeller stopping state are pushed out by the takeoff and landing platform.

In the present disclosure, the takeoff and landing platform can be used to push the uppermost UAV among the UAVs that are vertically stacked and in the propeller stopping state out of the takeoff and landing platform.

Specifically, the lifting module on the takeoff and landing platform may lift the UAV by the height of one UAV body to push all the uppermost UAVs on the takeoff and landing platform out of the takeoff and landing platform.

The pushed-out UAVs then take off.

In the present disclosure, after pushing the uppermost UAVs on the takeoff and landing platform out of the takeoff and landing platform, the propellers of these UAVs rotate and the UAVs take off. Then, the above steps are performed in a loop until all UAVs on the takeoff and landing platform take off in sequence from top to bottom.

Specifically, since the UAVs are pushed out of the takeoff and landing platform and then rotate their propellers, the operation of the UAV rotating the propellers on the takeoff and landing platform can be avoided, so as to avoid interference between the propellers of the UAV and the takeoff and landing platform to the greatest extent, the takeoff safety of the UAV is therefore improved.

In some exemplary embodiments of the present disclosure, the method for the plurality of UAVs to take off from the takeoff and landing platform may include the following sub-steps:

First, under the push-out effect of the takeoff and landing platform, the plurality of vertically stacked UAVs are pushed out of the takeoff and landing platform.

In the present disclosure, the takeoff and landing platform pushes all UAVs vertically stacked on the takeoff and landing platform out of the takeoff and landing platform.

Specifically, the lifting module on the takeoff and landing platform may lift the plurality of UAVs higher until all the UAVs on the takeoff and landing platform are pushed out of the takeoff and landing platform.

Next, the plurality of UAVs rotates the propellers thereof to reach a hovering state.

In the present disclosure, after all UAVs on the takeoff and landing platform are pushed out of the takeoff and landing platform, the propellers of the plurality of UAVs rotate, so that the plurality of UAVs reach a hovering state. That is, the plurality of UAVs pushed out of the takeoff and landing platform is in a state ready to take off.

Finally, the plurality of UAVs in the hovering state takes off simultaneously.

In the present disclosure, when the plurality of UAVs are pushed out of the takeoff and landing platform and rotate the propellers thereof to reach the hovering state, the plurality of UAVs may take off at the same time to reach the target location(s) thereof, and the take-off effect is therefore extremely high.

Specifically, by means of controlling the takeoff and landing platform to push out the plurality of vertically stacked UAVs, controlling the plurality of UAVs to rotate the propellers to reach a hovering state, and finally controlling the plurality of UAVs in the hovering state to take off simultaneously, the present disclosure may prevent the UAV from rotating the propellers on the takeoff and landing platform, so as to avoid interference between the UAV propellers and the takeoff and landing platform to the greatest extent. This may improve the take-off safety of the UAVs and achieve higher take-off efficiency.

It should be noted that the take-off speed of the UAV needs to be determined according to the take-off mode of the UAV. For details, reference may be made to the foregoing exemplary embodiments, which will not be described again herein.

Step S32: In response to a received recall instruction, the plurality of UAVs land and are stacked vertically on the takeoff and landing platform along the guide rail.

In the present disclosure, after the UAVs receive the recall instruction sent by the main control device, the UAVs land on the guide carrier plate and are then vertically stacked on the takeoff and landing platform along the guide rail of the takeoff and landing platform, so as to land on the takeoff and landing platform.

In some exemplary embodiments of the present disclosure, the method for the plurality of UAVs to land on the takeoff and landing platform may include the following sub-steps:

First, the UAVs are recalled to the top of the takeoff and landing platform and switched to the hovering state.

In the present disclosure, when the UAVs need to be recalled, the main control device may control the first UAV to land within the range of the guide carrier plate of the takeoff and landing platform through precise landing, and then reduce the rotation speed of the propellers of the UAV, causing the UAV to switch from a flight state to a hovering state.

In practical applications, a first identity mark may be provided on the guide carrier plate of the takeoff and landing platform. During the landing process, the UAV may precisely land within the range of the guide carrier board by identifying the first identity mark on the guide carrier board. The first identity mark may include, but is not limited to, image marks such as QR codes, or contour features such as protrusions or recesses. The present disclosure does not specifically limit the first identity mark.

Next, after each UAV is confirmed to be in the hovering state, the UAVs in the hovering state land and are stacked vertically on the takeoff and landing platform along the guide rail.

In the present disclosure, after determining that one of the UAVs has landed within the range of the guide carrier plate of the takeoff and landing platform and is in a hovering state, the UAV may be controlled to further land and be stacked on the takeoff and landing platform along the guide rail.

Specifically, after the first UAV lands on the guide carrier plate of the takeoff and landing platform, the main control device may control the guide carrier plate to lower by the height of the UAV body to recover the UAV on the guide carrier plate to the takeoff and landing platform. Next, the above steps are repeated to recall the second UAV to the range of the takeoff and landing platform and control this UAV to switch to the hovering state.

Specifically, during the landing process of the second UAV, the position of the first UAV that has landed on the takeoff and landing platform can be referenced to perform precise landing. In practical applications, a second identity may be provided on each UAV. By identifying the second identity mark on the UAV, another UAV may be controlled to precisely land within the range of this UAV. The second identity mark may include, but is not limited to, image marks such as QR codes, or contour features such as protrusions or recesses. The present disclosure does not specifically limit the second identity mark.

In practical applications, since the protruding structure is arranged at the bottom of the UAV and the recessing structure is provided at the top of the UAV, in the event that the bottom of the second UAV lands in the range of the first UAV and is in a hovering state, the protruding structure at the bottom of the upper UAV may slide along the recessing structure at the top of the lower UAV until the upper UAV lands on the bearing platform at the top of the lower UAV to complete the landing of the second UAV.

In the present disclosure, after the second UAV lands on the first UAV on the takeoff and landing platform, the main control device may control the guide carrier plate to lower by the height of one UAV body to recover the second UAV to the takeoff and landing platform. Next, the landing steps of the second UAV are repeated until all UAVs are recalled and stacked vertically on the takeoff and landing platform along the guide rail.

In some exemplary embodiments of the present disclosure, the method for the plurality of UAVs to land on the takeoff and landing platform may include the following sub-steps:

First, the plurality of UAVs are simultaneously recalled to the top of the takeoff and landing platform, switched to a hovering state and arranged vertically in the vertical direction.

In the present disclosure, when the UAVs need to be recalled, the plurality of UAVs may be recalled to the top of the takeoff and landing platform at the same time and arranged vertically in order from top to bottom; thereafter, the plurality of UAVs may switch to the hovering state.

Specifically, in practical applications, the UAV arranged at the bottom may land within the range of the guide carrier plate of the takeoff and landing platform through precise landing. For specific implementation methods, reference may be made to the descriptions in the foregoing exemplary embodiments and will not be described again herein. Counting from bottom to top, the second UAV may precisely land on the top of the first UAV according to the position of the first UAV. For specific implementation methods, reference can also be made to the descriptions in the foregoing exemplary embodiments and will not be described again herein, and so on, until the UAVs are arranged vertically on the top of the takeoff and landing platform, and all UAVs are switched to the hovering state.

In the present disclosure, the UAV arranged at the bottom may land on the guide carrier plate of the takeoff and landing platform. The guide carrier plate includes a lower recess part and a first guide part, the lower recess part is arranged in the central area of the guide carrier plate, and the first guide part is arranged in the edge area of the guide carrier plate and surrounds the lower recess part. Thus, when the UAV landing on the guide carrier plate is in a hovering state, the bottom of the UAV may slide along the first guide part until the UAV lands on the lower recess part in the central area of the guide carrier plate to complete the landing of the UAV.

For two UAVs adjacent to each other, the upper UAV may land on the top of the lower UAV. Since the protruding structure is provided at the bottom of the UAV and the recessing structure is set at the top of the UAV, in the case where the bottom of the upper UAV comes within the range of the lower UAV and is in a hovering state, the protruding structure at the bottom of the upper UAV may slide along the recessing structure at the top of the lower UAV until the upper UAV lands on the bearing platform at the top of the lower UAV, thereby completing the landing of the upper UAV. By executing the above method in a loop, the plurality of UAVs may be vertically stacked on the takeoff and landing platform.

For example, in the case where 16 UAVs need to be stacked vertically on the takeoff and landing platform, these 16 UAVs may be recalled simultaneously to the top of the takeoff and landing platform, and the 16 UAVs may be arranged vertically in a vertical direction and switched to a hovering state.

Next, these UAVs in the hovering state land sequentially and are vertically stacked on the takeoff and landing platform along the guide rail.

In the present disclosure, when the plurality of UAVs are vertically arranged in the vertical direction and switched to the hovering state, the guide carrier plate of the takeoff and landing platform may be lowered to simultaneously recover the plurality of UAVs to the takeoff and landing platform.

It should be noted that the landing speed and timing of the plurality of UAVs need to be determined based on the recall mode of the UAVs. For details, reference may be made to the foregoing exemplary embodiments, and it will not be repeated herein.

In summary, the takeoff and landing control method described herein at least may have the following advantages:

In the present disclosure, in response to the received takeoff instruction, the plurality of UAVs take off from the takeoff and landing platform; in response to the received recall instruction, the plurality of UAVs land and are stacked vertically on the takeoff and landing platform along the guide rail. In this way, it is possible to avoid manual UAV take-off site layout, preparation, and landing recovery operations, and reduce manpower and site investment when multiple UAVs perform collaborative operations. It can not only reduce the cost of multiple UAV collaborative operations, but also improve the efficiency of multiple UAV collaborative operations.

The device embodiments described above are only illustrative; the units described as separate components may or may not be physically separate, parts displayed as units may or may not be physical units, they may be located in one place, or may be distributed across multiple network units. Some or all of the modules may be selected according to actual needs to achieve the purpose of the solution of certain embodiments. A person of ordinary skill in the art can understand and implement the methods without any creative efforts.

Reference herein to "one embodiment," "an embodiment," or "one or more embodiments" means that a particular feature, structure, or characteristic described in connection with the embodiment is included in at least one embodiment of the present disclosure. In addition, it is noted that the expression "in one embodiment" herein does not necessarily refer to the same embodiment.

In the description provided here, a number of specific details are described. However, it is understood that embodiments of the present disclosure may be practiced without these specific details. In some instances, well-known methods, structures, and techniques have not been shown in detail so as not to obscure the understanding of this disclosure.

In the claims, any reference signs placed between parentheses shall not be construed as limiting the claim. The word "comprising" does not exclude the presence of elements or steps not listed in the claim. The word "a" or "an" preceding an element does not exclude the presence of a plurality of such element. The present disclosure may be implemented by means of hardware comprising several different elements and by means of a suitably programmed computer. In a claim enumerating several devices, some of these means may be embodied by the same item of hardware. The use of the words first, second, third, etc. does not indicate any order. These words can be interpreted as names.

Finally, it should be noted that the above exemplary embodiments are only used to illustrate the technical solutions of the present disclosure, but not to limit them. Although the present disclosure has been described in detail with reference to the foregoing exemplary embodiments, a person of ordinary skill in the art will understand as follows: it is still possible to modify the technical solutions disclosed in the foregoing exemplary embodiments, or to equivalently substitute some of the technical features thereof; however, these modifications or substitutions do not cause the essence of the corresponding technical solution to deviate from the principle and scope of the technical solution of each embodiment disclosed in the present disclosure.

What is claimed is:

1. A platform for one or more unmanned aerial vehicles (UAVs), comprising:
 a base;
 a bracket, comprising a guide rail extended upright from the base;
 an accommodating portion defined in the bracket and forming a storage space extended along the guide rail to accommodate the one or more UAVs, the accommodating portion comprising an opening for the one or more UAVs to vertically land through or launch from a top of the storage space;
 a guide member comprising a flow guide frame on a top part of the bracket surrounding the storage space, and the flow guide frame being configured to utilize a downward air flow generated by the one or more UAVs to push the one or more UAVs toward the storage space.

2. The platform according to claim 1, wherein
 the one or more UAVs comprises a plurality of UAVs;
 when the plurality of UAVs is stacked vertically on the bracket, the platform has a charging state in which the plurality of UAVs is charged by the platform.

3. The platform according to claim 2, further comprising:
 one or more first charging modules vertically stacked on the bracket, wherein
 in the charging state, one of the one or more first charging modules is electrically connected to a second charging module of one of the one or more UAVs for charging.

4. The platform according to claim 3, wherein
 each of the one or more first charging modules comprises a charging interface and a signal transmission interface;
 the charging interface is configured to charge the one or more UAVs; and the signal transmission interface is configured to perform data exchange between each of the one or more first charging module and the second charging module.

5. The platform according to claim 2, wherein
the platform further has a storage state; and
positions of the plurality of UAVs relative to the bracket in the storage state are more compact than positions of the plurality of UAVs relative to the bracket in the charging state.

6. The platform according to claim 1, wherein
the bracket comprises a first bracket and a second bracket spaced apart from each other; and
the storage space is formed between the first bracket and the second bracket.

7. The platform according to claim 1, wherein
the bracket comprises one bracket, and the storage space is formed on the bracket.

8. The platform according to claim 7, wherein
each of the one or more UAVs comprises a mounting through hole; and
when the one or more UAVs is vertically landed on the bracket, the bracket is sleeved by the mounting through holes of the one or more UAVs.

9. The platform according to claim 1, wherein
the guide rail on the bracket is at least partially embedded in the one or more UAVs to limit movement of the UAVs in the storage space.

10. The platform according to claim 1, further comprising:
a guide carrier plate, wherein
the guide carrier plate is at least partially disposed in the storage space, and the guide carrier plate is configured to carry the one or more UAVs.

11. The platform according to claim 10, wherein
the bracket comprises a lifting module to lift the one or more UAVs, wherein
the lifting module is connected to the guide carrier plate, and is configured to slide along the bracket.

12. The platform according to claim 11, further comprising:
a control module electrically connected to the lifting module, wherein
the control module is configured to:
control the lifting module to drive the guide carrier plate to move down to allow the one or more UAVs to vertically stack on the bracket along the guide rail in a landing process of the plurality of the one or more UAVs, or
control the lifting module to drive the guide carrier plate to move up to allow the one or more UAVs to take off from the bracket in a takeoff process of the one or more UAVs.

13. The platform according to claim 1, further comprising:
the guide member connected to the bracket, wherein
the guide member is configured to guide the one or more UAVs into the storage space.

14. The platform according to claim 1, wherein
the guide member comprises a plurality of air flow generating devices, wherein
the plurality of air flow generating devices is arranged on a top part of the bracket to surround the storage space, and
the plurality of air flow generating devices is configured to push the plurality of UAVs toward the storage space.

15. The platform according to claim 1, further comprising:
a lifting device; wherein
a lifting direction of the lifting device is consistent with an extending direction of the bracket, and
the lifting device is configured to transport a target carried by the one or more UAVs when the one or more UAVs is stacked on the bracket.

16. The platform according to claim 1, wherein an auxiliary moving device is disposed on a bottom part of the base, and the auxiliary moving device is configured to assist the platform to move.

17. A docking system, comprising:
a platform, comprising:
a bracket, comprising a vertical guide rail;
a storage space for accommodating one or more unmanned aerial vehicles (UAVs); and
a guide member, connected to the bracket, and comprising a flow guide frame, wherein the flow guide frame is arranged on a top part of the bracket to surround the storage space, and the flow guide frame is configured to utilize a downward air flow generated by the one or more UAVs to push the one or more UAVs toward the storage space; and
the one or more UAVs, comprising:
one of a protruding structure and a recessing structure disposing at a bottom part of the UAV,
the other one of the protruding structure and the recessing structure disposing on a top part of the UAV, wherein
the protruding structure is configured to at least partially embed in the recessing structure to facilitate the UAV vertical stacking with other UAV of the one or more UAVs,
the one or more UAVs is configured to stack vertically on a takeoff and landing platform.

* * * * *